(12) United States Patent
Taguchi

(10) Patent No.: US 12,142,131 B2
(45) Date of Patent: Nov. 12, 2024

(54) SECURITY DEVICE AND SECURITY SYSTEM

(71) Applicant: C-t-i Co., Ltd., Tokyo (JP)

(72) Inventor: Makoto Taguchi, Tokyo (JP)

(73) Assignee: DoInnovation. Inc., Tokyo (JP)

( * ) Notice: Subject to any disclaimer, the term of this patent is extended or adjusted under 35 U.S.C. 154(b) by 274 days.

(21) Appl. No.: 17/595,773

(22) PCT Filed: Jul. 2, 2019

(86) PCT No.: PCT/JP2019/026216
§ 371 (c)(1),
(2) Date: Nov. 24, 2021

(87) PCT Pub. No.: WO2021/001913
PCT Pub. Date: Jan. 7, 2021

(65) Prior Publication Data
US 2022/0223028 A1 Jul. 14, 2022

(51) Int. Cl.
*G08B 25/10* (2006.01)
*H04W 4/38* (2018.01)
*H04W 4/80* (2018.01)

(52) U.S. Cl.
CPC .............. *G08B 25/10* (2013.01); *H04W 4/38* (2018.02); *H04W 4/80* (2018.02)

(58) Field of Classification Search
CPC ........ G08B 13/00; G08B 13/10; G08B 13/12; G08B 13/122; G08B 12/124;
(Continued)

(56) References Cited

U.S. PATENT DOCUMENTS 10,573,106 B1 * 2/2020 Brady ................. G06V 40/1365
2017/0263065 A1 * 9/2017 Johnson ................... E05B 45/06
(Continued)

FOREIGN PATENT DOCUMENTS

JP  2001264431 A  9/2001
JP  2003303379 A  10/2003
(Continued)

OTHER PUBLICATIONS

International Search Report (PCT/ISA/210) with English translation and Written Opinion (PCT/ISA/237) mailed on Aug. 20, 2019, by the Japanese Patent Office as the International Searching Authority for International Application No. PCT/JP2019/026216.

*Primary Examiner* — Brian Wilson
(74) *Attorney, Agent, or Firm* — Buchanan Ingersoll & Rooney PC

(57) ABSTRACT

A security device is provided with a plurality of detectors for detecting a person, and controls the security status of a security target, the security device being provided with: a detection sequence comparison unit which performs a comparison to determine whether the sequence in which the person was detected by the detector coincides with a pre-stored detection sequence that is performed by the detector and associated with the security setting status or security cancellation status; and a control unit which controls the security status of the security target from the security cancellation status to the security setting status, or controls the security status from the security setting status to the security cancellation status, if the result of the comparison by the detection sequence comparison unit indicates that the sequence in which the person was detected by the detector coincides with the detection sequence performed by the detector.

17 Claims, 17 Drawing Sheets

(58) Field of Classification Search
CPC ............ G08B 13/2491; G08B 13/2494; G08B 13/2497; G08B 25/10; H04W 4/38; H04W 4/80; G06F 21/35
See application file for complete search history.

(56) References Cited

U.S. PATENT DOCUMENTS

2018/0091381 A1* 3/2018 McLaughlin ......... G06F 3/0482
2019/0051128 A1 2/2019 Yamashiro

FOREIGN PATENT DOCUMENTS

| | | |
|---|---|---|
| JP | 2005310066 A | 11/2005 |
| JP | 2006040112 A | 2/2006 |
| JP | 2006259857 A | 9/2006 |
| JP | 2010079344 A | 4/2010 |
| JP | 2012034253 A | 2/2012 |
| JP | 2017151893 A | 8/2017 |

* cited by examiner

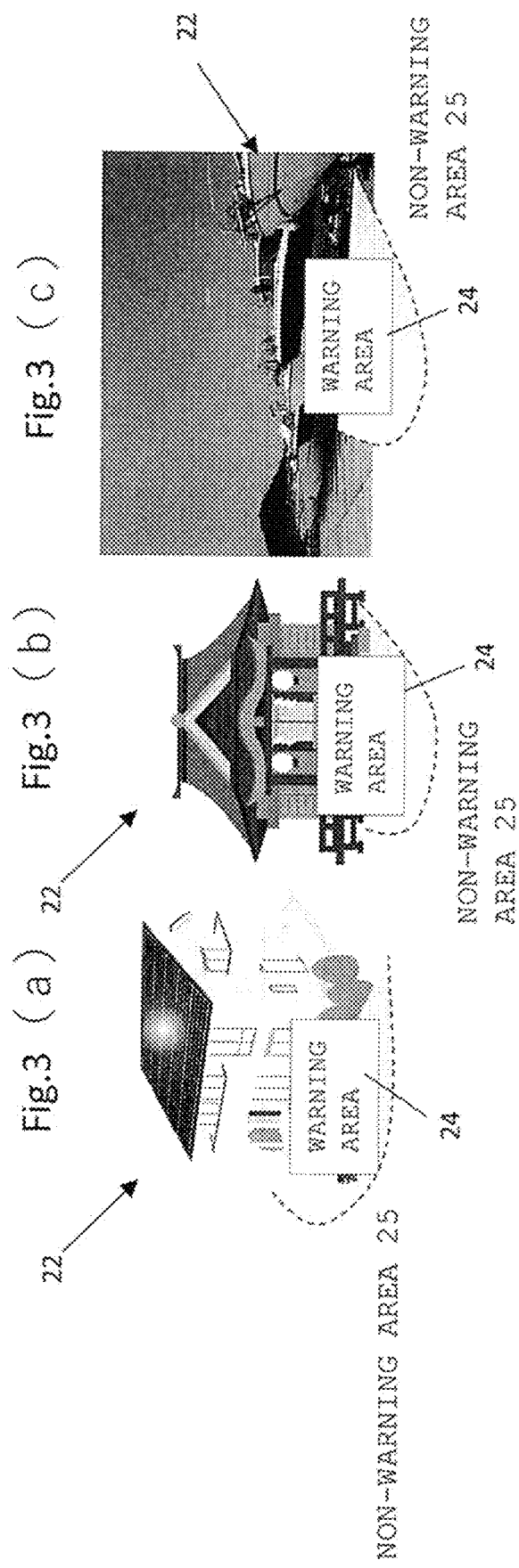
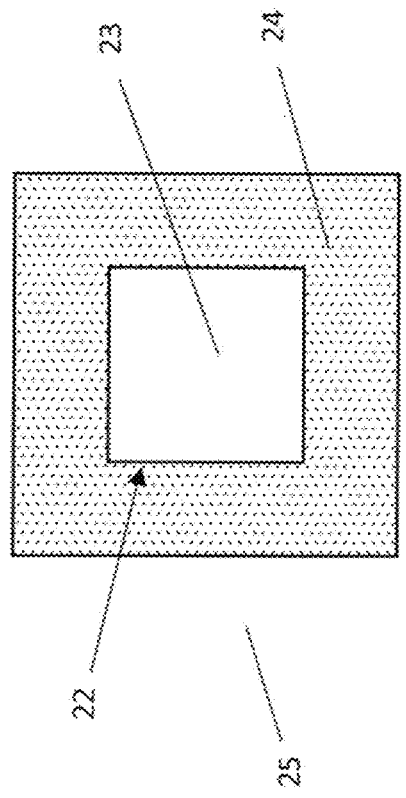
Fig.3 (a) Fig.3 (b) Fig.3 (c) Fig.3 (d)

| STATE | A | B | C | D | E | F | G | H | I | |
|---|---|---|---|---|---|---|---|---|---|---|
| TIME $t_n$ | $t_1$ | $t_2$ | $t_3$ | $t_4$ | $t_5$ | $t_6$ | $t_7$ | $t_8$ | $t_9$ | ... |
| INTENSITY OF DETECTION SIGNAL OF DETECTION MEANS 14A | 0 | 1 | 2 | 3 | 2 | 2 | 1 | 1 | 0 | ... |
| INTENSITY OF DETECTION SIGNAL OF DETECTION MEANS 14B | 0 | 0 | 0 | 0 | 0 | 1 | 1 | 2 | 2 | ... |

| STATE | A | B | C | D | E | F | G |
|---|---|---|---|---|---|---|---|
| DETECTION INTERVAL OF DETECTION MEANS 14A | LONG | SHORT | SHORT | SHORT | SHORT | LONG | LONG |
| DETECTION INTERVAL OF DETECTION MEANS 14B | LONG | SHORT | SHORT | SHORT | SHORT | SHORT | LONG |
| DETECTION INTERVAL OF DETECTION MEANS 14C | LONG | LONG | SHORT | SHORT | SHORT | SHORT | LONG |

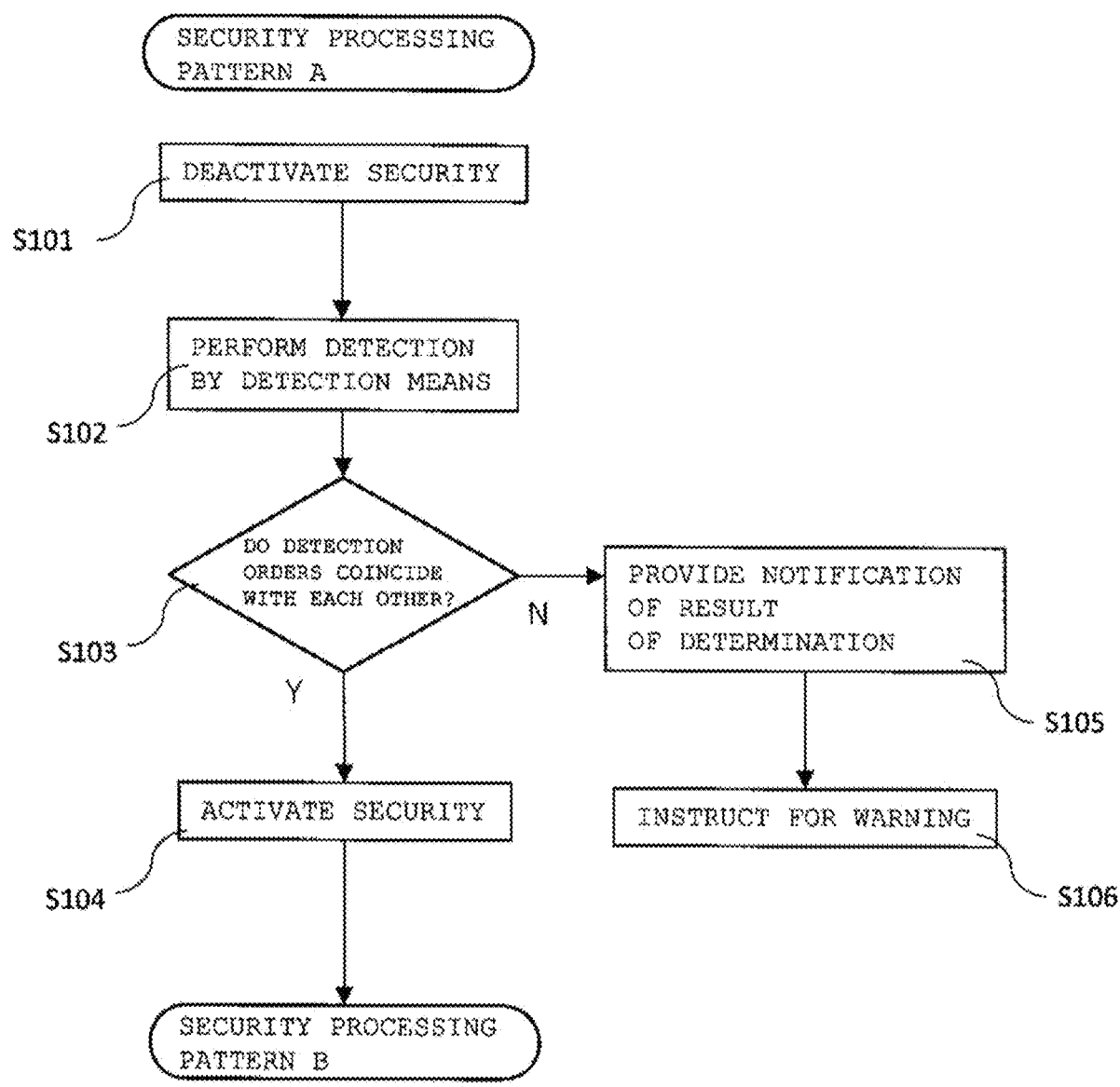

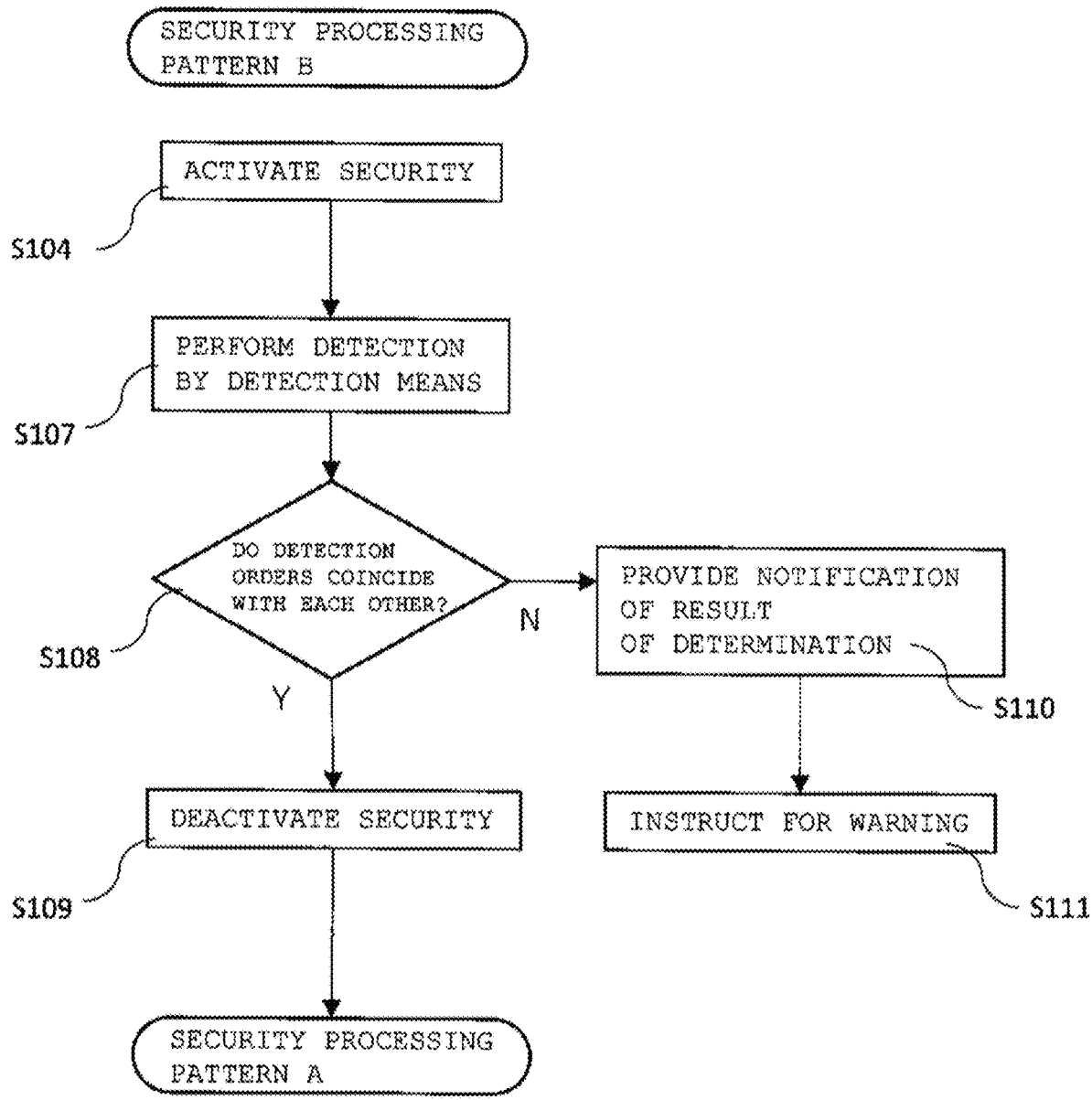

SECURITY DEVICE AND SECURITY SYSTEM

TECHNICAL FIELD

The present invention relates to a security device and a security system.

BACKGROUND ART

Various security devices and security systems have been proposed so far. Patent Literature 1 proposes a security device and security system that control a warning means such as a buzzer based on whether an RFID is present. Patent Literature 2 proposes a security system using a motion sensor and an RFID system.

CITATION LIST

Patent Literature

Patent Literature 1: JP 2003-303379 A
Patent Literature 2: JP 2005-310066 A

SUMMARY OF INVENTION

Technical Problem

The known security devices and security systems disclosed in Patent Literatures 1 and 2 described above are effective in entrance monitoring or access control for houses and buildings where it is easy to define a security area, but are inapplicable to some outdoor places such as a shrine, a temple, a greenhouse, an anchorage of a ship such as a yacht or a boat, a parking lot, a bicycle-parking lot, and a freight terminal where intrusion can be made from anywhere, that is, there are innumerable intrusion paths, and it is impossible to define an intrusion section and set a range of the intrusion section because it is difficult to define the security area.

Further, some of the known security devices and security systems include a surveillance camera, but it is difficult to determine whether an intruder is present through continuous visual check of an image obtained from the surveillance camera, and it is therefore impossible to ensure a security level that allows detection at the point of occurrence of an abnormality.

It is therefore an object of the present invention to provide a security device and a security system that can be introduced into a security target for which it is difficult to set a security area and have a high level of security.

Solution to Problem

According to the invention set force in claim 1, provided is a security device including a plurality of detection means configured to detect a person, the security device being configured to control a security status of a security target to a security-activated status or a security-deactivated status based on whether the person has been detected within a detection range of each of the detection means, the security device including:

a detection order comparison unit configured to perform a comparison to determine whether a detection order of the detection means that have detected the person coincides with a security-activation detection order of the detection means or a security-deactivation detection order of the detection means that is prestored;

a control unit configured to control the security status of the security target from the security-deactivated status to the security-activated status or from the security-activated status to the security-deactivated status when the comparison performed by the detection order comparison unit shows that the detection order of the detection means that have detected the person coincides with the security-activation detection order of the detection means or the security-deactivation detection order of the detection means; and a person detection position recognition unit configured to acquire a detection signal for the detection range of each of the detection means that have detected the person at a time $t_n$ to recognize of which detection means the person is present within the detection range based on intensity of the detection signal.

According to the invention set force in claim 14, provided is a security system including:

a server device;
a security device communicatively connected to the server device over a communication network;
a plurality of detection means provided within the security device or attached to the security device, the plurality of detection means being configured to detect a person;
an RFID reception device provided within the security device or attached to the security device;
a user terminal communicatively connected to the server device over the communication network; and
an RFID tag configured to communicate with the RFID reception device over radio waves, the security system being configured to control a security status of a security target to a security-activated status or a security-deactivated status based on whether the person has been detected within a detection range of each of the detection means and whether the RFID reception device has received identification information on the RFID tag or the RFID reception device has identified the RFID tag.

The server device includes:
a security status setting instruction unit configured to cause the user terminal to make a selection for the security status of the security target; and
a server device-side information transmission unit configured to transmit, to the security device, security status information based on the security status of the security target selected.

The security device includes:
a detection order comparison unit configured to perform a comparison to determine whether a detection order of the detection means that have detected the person coincides with a security-activation detection order of the detection means or a security-deactivation detection order of the detection means that is prestored;
a control unit configured to control the security status of the security target from the security-deactivated status to the security-activated status or from the security-activated status to the security-deactivated status;
an RFID identification unit configured to identify the RFID tag based on the identification information on the RFID tag received by the RFID reception device;
a determination unit configured to determine whether a suspicious person has intruded into the security target; and
a security device-side information transmission unit configured to transmit, to the server device, a result of the determination performed by the determination unit.

With the security status of the security target set to the security-activated status, when the comparison performed by the detection order comparison unit shows that the detection order of the detection means that have detected the person coincides with the security-deactivation detection order of the detection means and the RFID identification unit has identified the RFID tag, the determination unit determines that there is no abnormality in entry processing, and the control unit controls the security status of the security target to the security-deactivated status based on the security status information acquired from the server device, and with the security status of the security target set to the security-deactivated status, when the comparison performed by the detection order comparison unit shows that the detection order of the detection means that have detected the person coincides with the security-activation detection order of the detection means and the RFID reception device has not received the identification information on the RFID tag, the determination unit determines that there is no abnormality in exit processing, and the control unit controls the security status of the security target to the security-activated status based on the security status information acquired from the server device.

Advantageous Effects of Invention

According to the present invention, it is possible to provide a security device and a security system that can be introduced into a security target for which it is difficult to set a security area and have a high level of security.

BRIEF DESCRIPTION OF DRAWINGS

FIGS. 3(a) to 3(c) are diagrams each illustrating an example of a security target, and FIG. 3(d) is a conceptual diagram of an area where the security target is placed under security.

FIG. 10(a) is a flowchart illustrating an example of security processing performed by the security device illustrated in FIG. 1. FIG. 10(b) is a flowchart illustrating another example of the security processing performed by the security device illustrated in FIG. 1.

DESCRIPTION OF EMBODIMENTS

Figure 1:
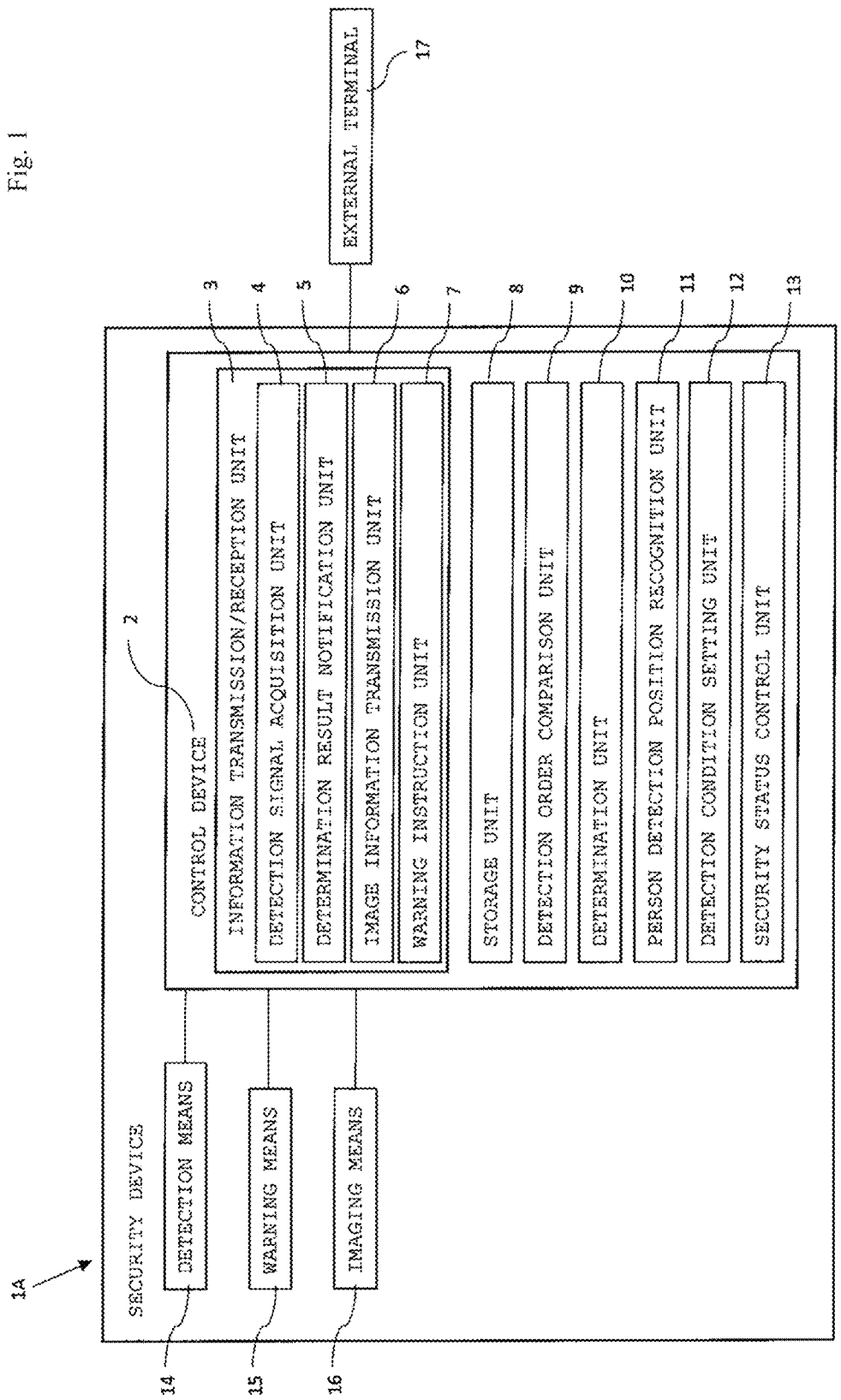
FIG. 1 is a diagram illustrating an example of a configuration of a security device according to the present invention.

A description will be given below of an example of an embodiment of the present invention with reference to the accompanying drawings.

[Security Device]

A security device according to the present embodiment includes a plurality of detection means that detect a person, and controls a security status of a security target to a security-activated status or a security-deactivated status based on whether the person has been detected within a detection range of each of the detection means.

Hereinafter, examples of the "security target" described in the present embodiment include a "building" such as a "house", an office (business office), a public facility, or an entertainment facility, a "structure" such as a shrine, a temple, or a greenhouse, and a "movable property" such as a vehicle including an automobile, a bicycle, and an armored cash transport car, or a ship including a yacht and a boat.

According to the present embodiment, a security area and a warning area are defined for the security target. The security area is an area where the inside of a building serving as the security target such as a house, an office (business office), a public facility, or an entertainment facility is placed under security. The warning area is an area around a building serving as the security target such as a house, an office (business office), a public facility, or an entertainment facility, a structure such as a shrine, a temple, or a greenhouse, or a movable property such as a vehicle including an automobile, a bicycle, and an armored cash transport car, or a ship including a yacht and a boat and is a warning area in the detection range of the detection means to be described later.

For example, for a house illustrated in FIG. 3(a) as an example of a security target 22, the inside of the house is defined as a security area 23, and the surroundings of the house are defined as a warning area 24, as illustrated in FIG. 3(d). For a shrine illustrated in FIG. 3(b), an area where a main hall is placed is defined as the security area 23, and the surroundings of the main hall are defined as the warning area 24, as illustrated in FIG. 3(d). For a ship such as a boat illustrated in FIG. 3(c), an area where the ship is placed is defined as the security area 23, and the surroundings of the ship are defined as the warning area 24, as illustrated in FIG.

3(*d*). Note that an area other than the security area 23 and the warning area 24 is defined as a non-warning area 25.

Then, the security device according to the present embodiment is installed in the security area 23 and/or the warning area 24 to place the security target 22 under security.

Further, "security activation" described in the present embodiment includes processing of activating a conventionally known locking device to close a lock, processing of imaging a security status of the security target by an imaging means to be described later, and the like, and "security deactivation" includes processing of opening the lock.

1. First Embodiment of Security Device

A security device 1A illustrated in FIG. 1 includes a control device 2 that controls various types of information processing, and is installed in the security area 23 and/or the warning area 24. A detection means 14, a warning means 15, and an imaging means 16 are connected to the control device 2, and an external terminal 17 is further communicatively connected to the control device 2 over a communication network such as the Internet, a radio communication network adhering to a radio communication standard, or a wired communication network adhering to a wired communication standard, examples of the external terminal 17 including a user terminal such as a smartphone, a tablet terminal, a personal computer, or a mobile phone used by a user related to the security target 22, and a service provider terminal such as a server device, a smartphone, a tablet terminal, a personal computer, or a mobile phone used or installed by a security service provider.

Examples of the detection means 14 include a conventionally known motion sensor, an RFID reader/writer, a photoelectric sensor, an ultrasonic sensor, and the like. According to the present embodiment, as illustrated in FIG. 4, the security device 1A includes a plurality of detection means 14.

Figure 4:
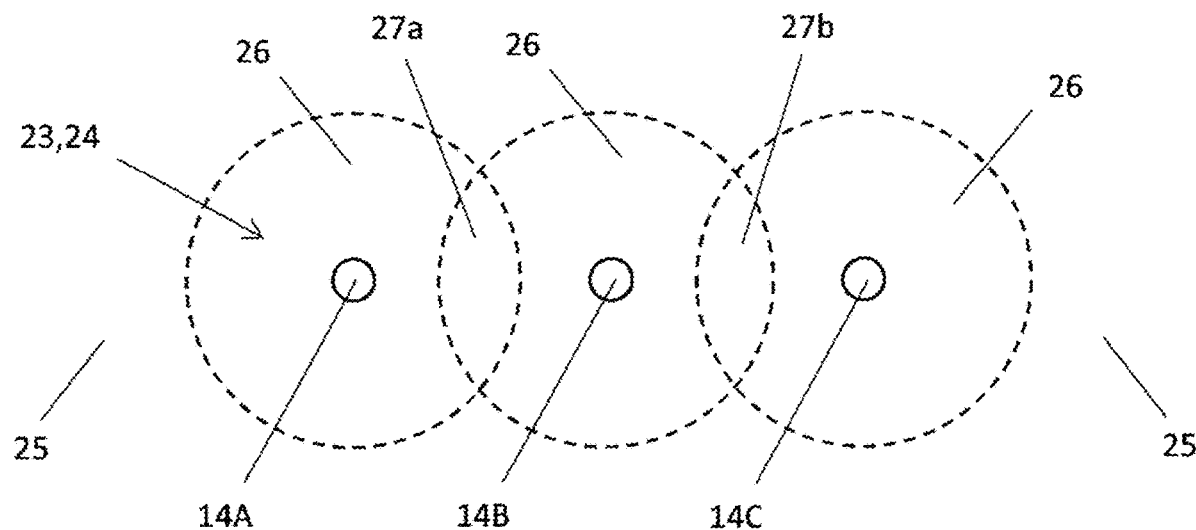
FIGS. 4(a) and 4(b) are diagrams illustrating examples of detection means included in the security device according to the present invention.
Figure 4:
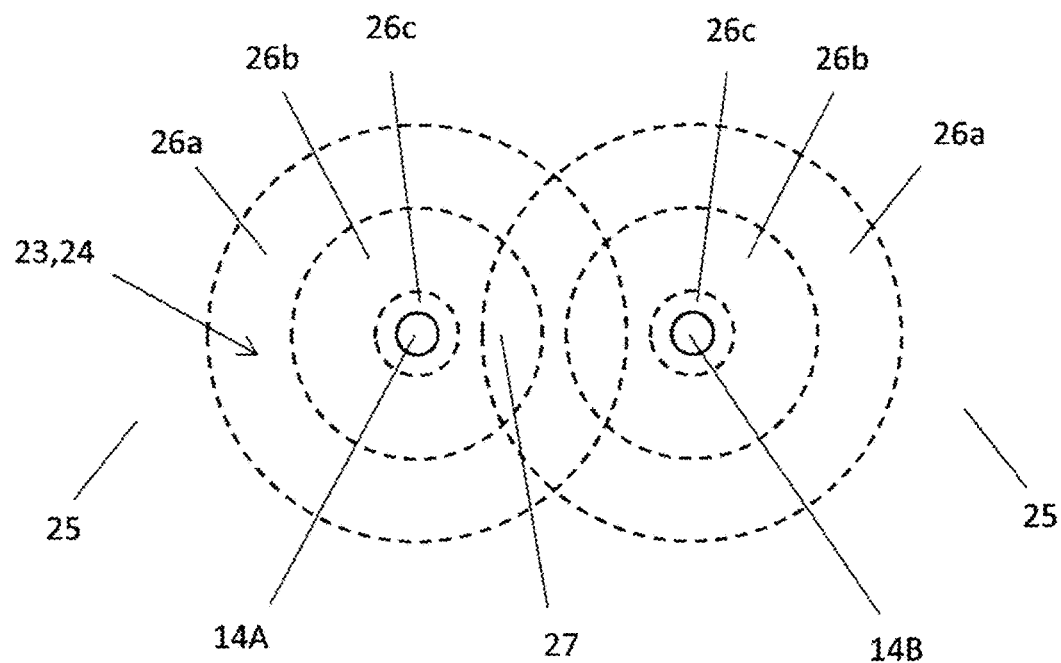

In the example illustrated in FIG. 4(*a*), a person is detected by three detection means 14A, 14B, 14C installed in the security area 23 and/or the warning area 24. Further, a detection range 26 of a first detection means 14 and a detection range 26 of a second detection means 14 overlap each other to form overlapping detection ranges 27*a*, 27*b*. In the detection range 26 of each detection means, a detection signal constant in intensity level is output.

In the example illustrated in FIG. 4(*b*), the detection means 14A, 14B have a plurality of detection ranges 26*a*, 26*b*, 26*c* different in detection intensity from each other. Over the detection range 26*a*, for example, a detection signal having an intensity level of "1" is output, over the detection range 26*b*, for example, a detection signal having an intensity level of "2" is output, and over the detection range 26*c*, for example, a detection signal having an intensity level of "3" is output.

Note that, in the configuration illustrated in FIG. 1, the detection means 14 is provided within the security device 1A, or alternatively, may be provided separately from the security device 1A and attached to the security device 1A.

Examples of the warning means 15 include a conventionally known warning buzzer, a light emitting device, and the like. When a determination unit 10 (to be described later) determines that there is an intrusion abnormality based on a result of determination of whether a suspicious person has intruded into the security target 22 with the security target 22 placed under the security-activated status or the security-deactivated status, the warning buzzer sounds a warning, and the light emitting device emits light, so as to provide notification of the abnormality.

Examples of the imaging means 16 include a conventionally known surveillance camera, a web camera, and the like. The imaging means 16 records, for the security target 22, the security status of the security area 23 and the warning area 24 as a still image or a moving image.

As illustrated in FIG. 1, the control device 2 includes an information transmission/reception unit 3, a storage unit 8, a detection order comparison unit 9, the determination unit 10, a person detection position recognition unit 11, a detection condition setting unit 12, and a security status control unit 13.

The information transmission/reception unit 3 transmits and receives information to and from the detection means 14, the warning means 15, the imaging means 16, and the external terminal 17. According to the present embodiment, the information transmission/reception unit 3 includes a detection signal acquisition unit 4, a determination result notification unit 5, an image information transmission unit 6, and a warning instruction unit 7.

The detection signal acquisition unit 4 acquires s detection signal output by the detection means 14.

The determination result notification unit 5 notifies the external terminal 17 of a result of determination that a suspicious person has intruded into the security target 22 performed by the determination unit 10 (to be described later). The user or the security service provider who owns and uses the external terminal 17 can know the security status of the security target 22 and can take a corresponding measure.

The image information transmission unit 6 transmits information on a security state of the security target 22 to the external terminal 17. For example, image information containing the still image or moving image obtained as a result of capturing the security area 23 and the warning area 24 of the security target 22 by the imaging means 16 is transmitted to the external terminal 17. The user or the security service provider who owns and uses the external terminal 17 can know the security status of the security target 22 from the transmitted information on the security state of the security target 22 and can take a corresponding measure.

When the determination unit 10 (to be described later) determines that there is an intrusion abnormality based on a result of determination of whether a suspicious person has intruded into the security target 22 with the security target 22 placed under the security-activated status or the security-deactivated status, the warning instruction unit 7 instructs the warning means 15 to provided notification of the above-described abnormality.

The storage unit 8 stores various kinds of information such as a security-activation or security-deactivation detection order of the detection means for comparison processing performed by the detection order comparison unit 9 (to be described later), and image information obtained as a result of capturing the security area 23 and the warning area 24 of the security target 22 by the imaging means 16.

The detection order comparison unit 9 performs a comparison to determine whether the detection order of the detection means 14 that have detected a person coincides with the security-activation or security-deactivation detection order of the detection means prestored in the storage unit 8. This comparison processing will be described in the following determination processing 1.

The determination unit 10 performs the following determination processing.

(Determination Processing 1)

The security status of the security target 22 is determined based on a result of the comparison, performed by the detection order comparison unit 9, to determine whether the detection order of the detection means 14 that have detected the person coincides with the security-activation or security-deactivation detection order of the detection means prestored in the storage unit 8.

In the configurations illustrated in FIGS. 4(*a*) and 5, information on the security-activation or security-deactivation detection order of the detection means indicating "first: the detection means 14A, second: a combination of the detection means 14A and the detection means 14B, third: the detection means 14B, fourth: a combination of the detection means 14B and the detection means 14C, and fifth: the detection means 14C" is prestored in the storage unit 8.

Figure 5:
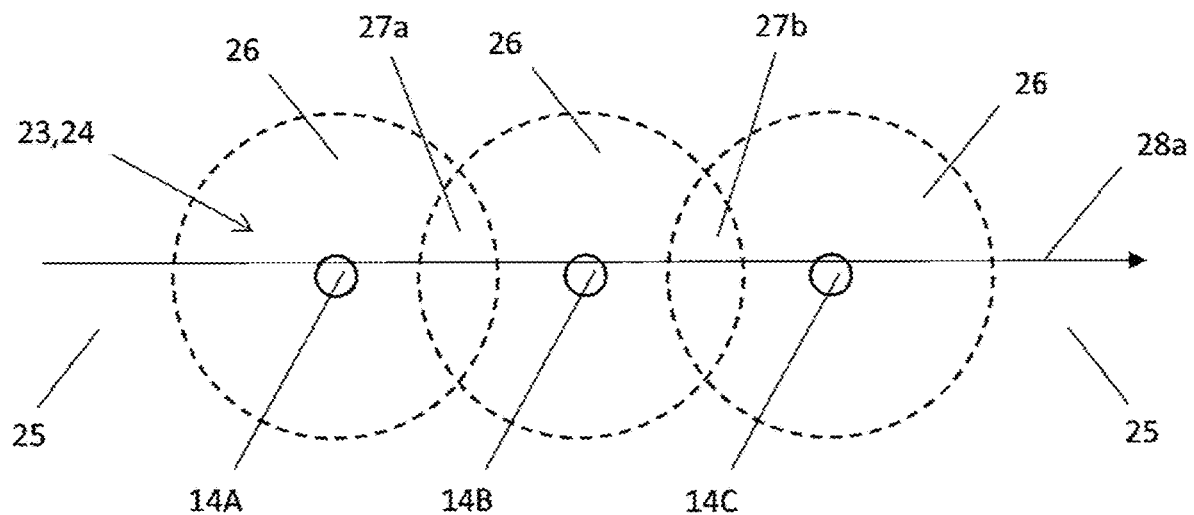
FIGS. 5(a) and 5(b) are conceptual diagrams of a state where the security target is placed under security using the security device including the detection means illustrated in FIG. 4(a).
Figure 5:
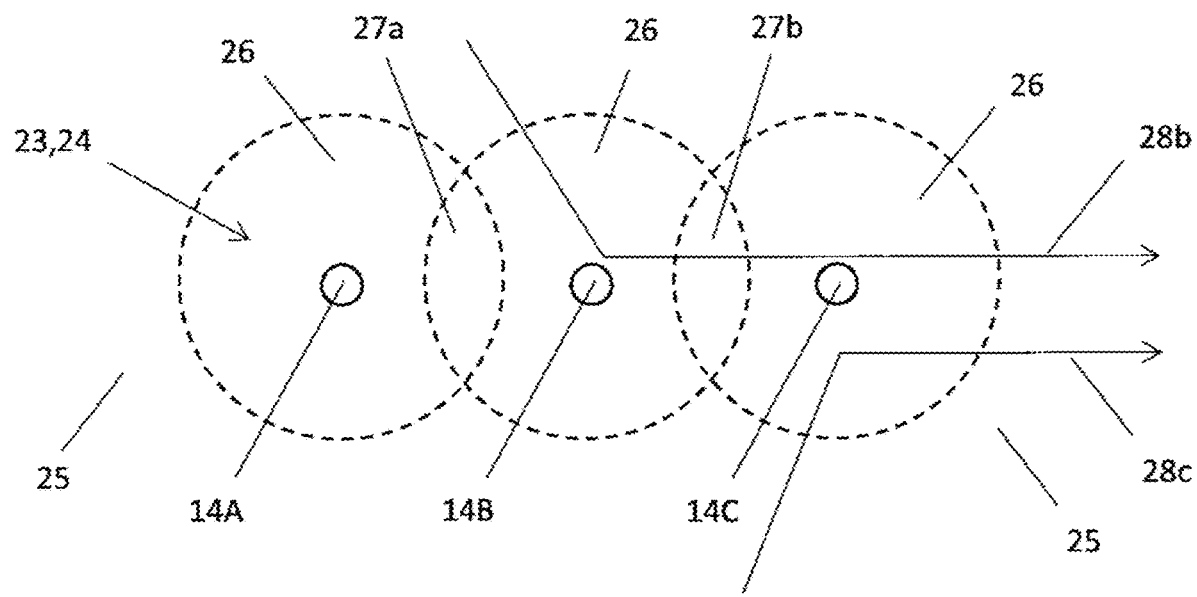

In FIG. 5(*a*), when the security status of the security target 22 is set to the security-activated status or the security-deactivated status, and a certain person moves on a movement path 28*a* through the security area 23 or the warning area 24, the person is detected in the order of the detection range 26 of the detection means 14A, the overlapping detection range 27*a* between the detection means 14A and the detection means 14B, the detection range 26 of the detection means 14B, the overlapping detection range 27*b* between the detection means 14B and the detection means 14C, and the detection range 26 of the detection means 14C.

The detection order comparison unit 9 performs a comparison to determine whether the above-described detection order of the detection means 14 that have detected the person on the movement path 28*a* coincides with the security-activation or security-deactivation detection order of the detection means prestored in the storage unit 8.

Because, with the security status of the security target 22 illustrated in FIG. 5(*a*) set to the security-activated status or the security-deactivated status, the above-described detection order of the detection means 14 that have detected the person on the movement path 28*a* coincides with the above-described security-activation or security-deactivation detection order of the detection means prestored in the storage unit 8, the determination unit 10 determines that there is no abnormality in entry processing or no abnormality in exit processing.

On the other hand, in FIG. 5(*b*), when the security status of the security target 22 is set to the security-activated status or the security-deactivated status, and a certain person moves on a movement path 28*b* through the security area 23 or the warning area 24, the person is detected in the order of the detection range 26 of the detection means 14B, the overlapping detection range 27*b* between the detection means 14B and the detection means 14C, and the detection range 26 of the detection means 14C. When a certain person moves through the security area 23 or the warning area 24 on a movement path 28*c*, the person is detected in the detection range 26 of the detection means 14C.

The detection order comparison unit 9 performs a comparison to determine whether the above-described detection order of the detection means 14 that have detected the person on the movement paths 28*b*, 28*c* coincide with the security-activation or security-deactivation detection order of the detection means prestored in the storage unit 8.

Because, with the security status of the security target 22 illustrated in FIG. 5(*b*) is set to the security-activated status or the security-deactivated status, the above-described detection order of the detection means 14 that have detected the person on the movement paths 28*b*, 28*c* does not coincide with the security-activation or security-deactivation detection order of the detection means prestored in the storage unit 8, the determination unit 10 determines that there is an intrusion abnormality.

The person detection position recognition unit 11 acquires a detection signal for the detection range 26 of the detection means 14 that have detected the person at a time $t_n$, and performs processing of recognizing of which detection means 14 the person is present within the detection range 26 based on the intensity of the detection signal.

Figure 6:
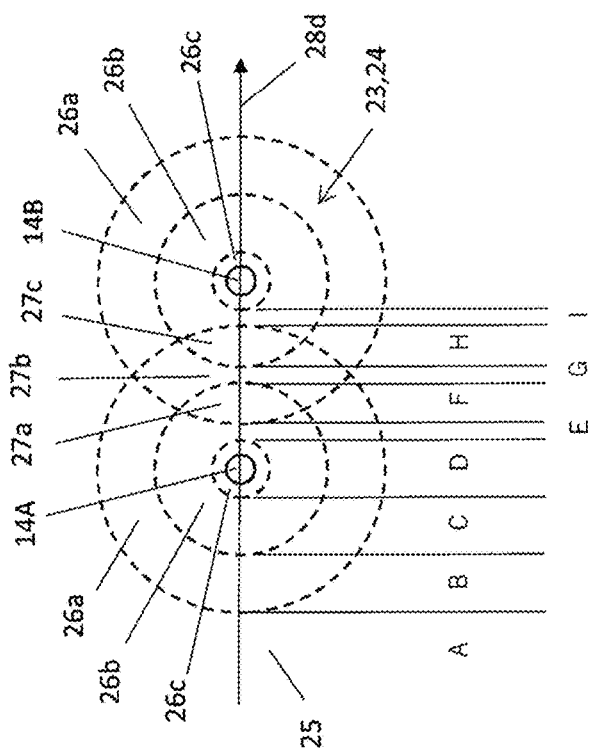
FIG. 6(a) is a conceptual diagram of a state where a movement path of a person is recognized using the security device including the detection means illustrated in FIG. 4(b).
FIG. 6(b) is a table showing an example of intensity of a detection signal of the detection means at a time $t_n$.

In the configuration illustrated in FIG. 6(*a*), the plurality of detection means 14A, 14B illustrated in FIG. 4(*b*) are installed in the security area 23 and/or the warning area 24, and the security status of the security target 22 is set to the security-activated status or the security-deactivated status. For example, when the detection means 14A, 14B output the detection signals at the time $t_n$ as illustrated in FIG. 6(*b*), the person detection position recognition unit 11 performs processing of recognizing the detection position of the person as follows.

Neither of the detection means 14A, 14B outputs the detection signal at a time $t_1$, so that the person detection position recognition unit 11 determines that no person is present in the security area 23 or the warning area 24.

The detection means 14A outputs the detection signal with the detection signal intensity of "1" at a time $t_2$, so that the person detection position recognition unit 11 determines that the person is present in the detection range 26*a* of the detection means 14A.

The detection means 14A outputs the detection signal with the detection signal intensity of "2" at a time $t_3$, so that the person detection position recognition unit 11 determines that the person is present in the detection range 26*b* of the detection means 14A.

The detection means 14A outputs the detection signal with the detection signal intensity of "3" at a time $t_4$, so that the person detection position recognition unit 11 determines that the person is present in the detection range 26*c* of the detection means 14A.

The detection means 14A outputs the detection signal with the detection signal intensity of "2" at a time $t_5$, so that the person detection position recognition unit 11 determines that the person is present in the detection range 26*b* of the detection means 14A.

At a time $t_6$, the detection means 14A outputs the detection signal with the detection signal intensity of "2", and the detection means 14B outputs the detection signal with the detection signal intensity of "1", so that the person detection position recognition unit 11 determines that the person is present in the overlapping detection range 27*a* between the detection range 26*b* of the detection means 14A and the detection range 26*a* of the detection means 14B.

At a time $t_7$, the detection means 14A outputs the detection signal with the detection signal intensity of "1", and the detection means 14B outputs the detection signal with the detection signal intensity of "1", so that the person detection position recognition unit 11 determines that the person is present in the overlapping detection range 27*b* between the detection range 26*a* of the detection means 14A and the detection range 26*a* of the detection means 14B.

At a time $t_8$, the detection means 14A outputs the detection signal with the detection signal intensity of "1", and the detection means 14B outputs the detection signal with the detection signal intensity of "2", so that the person detection position recognition unit 11 determines that the person is present in the overlapping detection range 27*c* between the detection range 26*a* of the detection means 14A and the detection range 26*b* of the detection means 14B.

The detection means 14B outputs the detection signal with the detection signal intensity of "2" at a time $t_9$, so that the person detection position recognition unit 11 determines that the person is present in the detection range 26b of the detection means 14B.

In the configuration illustrated in FIG. 6, when the above-describing processing is repeatedly performed, a fact that a certain person has moved on a movement path 28d through the security area 23 or the warning area 24 is recognized based on a time-series evaluation of the detection signal intensity of the detection means 14.

The detection condition setting unit 12 performs processing of setting a detection interval of each detection means based on whether a person has been detected by the detection means 14. In this case, a first detection means is associated with a second detection means adjacent to the first detection means, and when the first detection means detects the person, the second detection means associated with the first detection means is also controlled to have its detection interval set in conjunction with the first detection means.

In the configuration illustrated in FIG. 7(a), the plurality of detection means 14A, 14B, 14C illustrated in FIG. 4(a) are installed in the security area 23 and/or the warning area 24, and the security status of the security target 22 is set to either the security-activated status or the security-deactivated status. The detection means 14A is associated with the detection means 14B adjacent to the detection means 14A, the detection means 14B is associated with the detection means 14A, 14C adjacent to the detection means 14B, and the detection means 14C is associated with the detection means 14B adjacent to the detection means 14B.

When a certain person moves on a movement path 28e through the security area 23 or the warning area 24, the detection condition setting unit 12 performs processing of setting the detection intervals of the detection means 14A, 14B, 14C as follows.

The non-warning area 25 (state A) is located out of the detection ranges of the detection means 14A, 14B, 14C, so that the detection condition setting unit 12 sets the detection interval of each detection means to a "long" state such as 10 to 20 seconds.

In the detection range 26 (state B) of the detection means 14A, the detection means 14A detects the person, so that the detection condition setting unit 12 sets the detection interval of the detection means 14A to a "short" state such as 2 to 4 seconds. In this case, the detection means 14B, 14C do not detect the person, but the detection means 14B is associated with the detection means 14A, so that the detection condition setting unit 12 also sets, to the "short" state, the detection interval of the detection means 14B adjacent to the detection means 14A that has detected the person.

In the overlapping detection range 27a (state C) between the detection means 14A and the detection means 14B, the detection means 14A, 14B detect the person. In this case, the detection means 14C does not detect the person, but the detection means 14C is associated with the detection means 14B, so that the detection condition setting unit 12 also sets, to the "short" state, the detection interval of the detection means 14C adjacent to the detection means 14B that has detected the person.

In the detection range 26 (state D) of the detection means 14B, the detection means 14B detects the person. In this case, the detection means 14A, 14C do not detect the person, but the detection means 14A, 14C are associated with the detection means 14B, so that the detection condition setting unit 12 maintains, in the "short" state, the detection intervals of the detection means 14A, 14C adjacent to the detection means 14B that has detected the person.

In the overlapping detection range 27b (state E) between the detection means 14B and the detection means 14C, the detection means 14B, 14C detect the person. In this case, the detection means 14A does not detect the person, but the detection means 14A is associated with the detection means 14B, the detection condition setting unit 12 maintains the detection interval of the detection means 14A in the "short" state.

In the detection range 26 (state F) of the detection means 14C, the detection means 14C detects the person. In this case, the detection means 14A does not detect the person, so that the detection condition setting unit 12 sets the detection interval of the detection means 14A to the "long" state. Further, the detection means 14B does not detect the person, but the detection means 14B is associated with the detection means 14C, so that the detection condition setting unit 12 maintains the detection interval of the detection means 14B in the "short" state.

The non-warning area 25 (state G) is located out of the detection ranges of the detection means 14A, 14B, 14C, so that the detection condition setting unit 12 sets the detection intervals of the detection means 14B, 14C to the "long" state.

Further, when the determination unit 10 determines that there is an intrusion abnormality based on a result of the above-described determination processing, the detection condition setting unit 12 sets the detection intervals of the detection means 14A, 14B, 14C to the "short" state.

Figure 7:
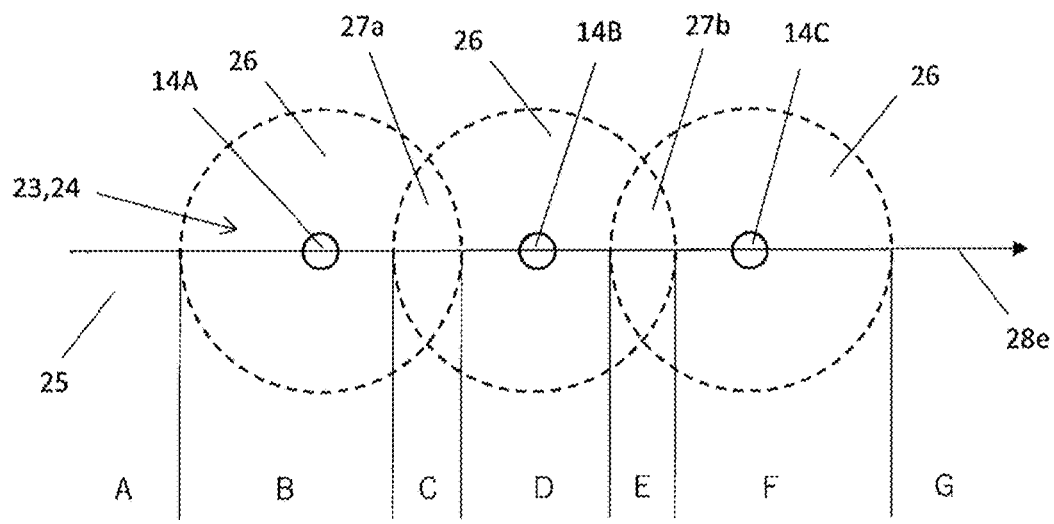
FIG. 7(a) is a conceptual diagram of a state where detection intervals of the detection means are set for the security device including the detection means illustrated in FIG. 4(a).
FIG. 7(b) is a table showing examples of the detection intervals of the detection means illustrated in FIG. 7(a).
Figure 8:
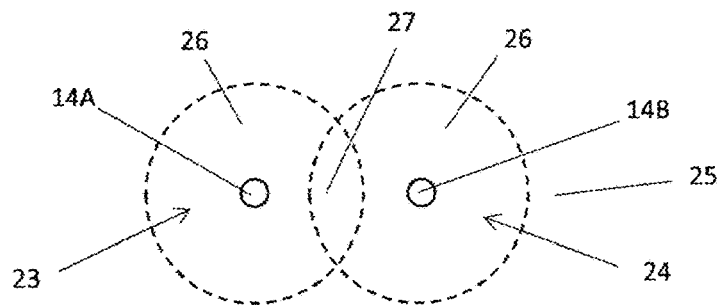
FIGS. 8(a) to 8(c) are diagrams illustrating an example of a state where the security target is placed under security using the security device illustrated in FIG. 1.
Figure 8:
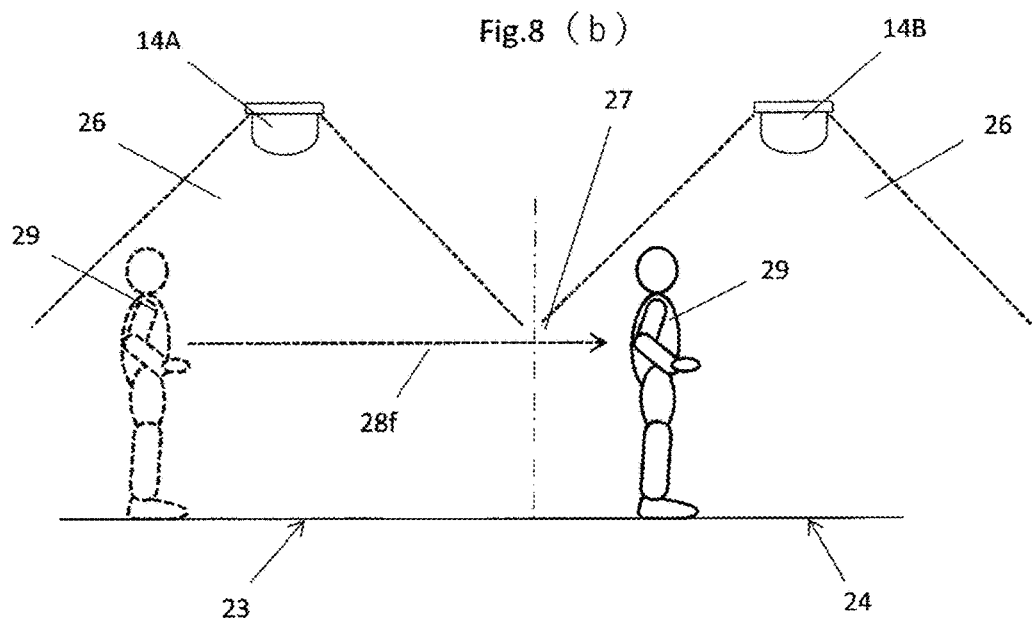
Figure 8:
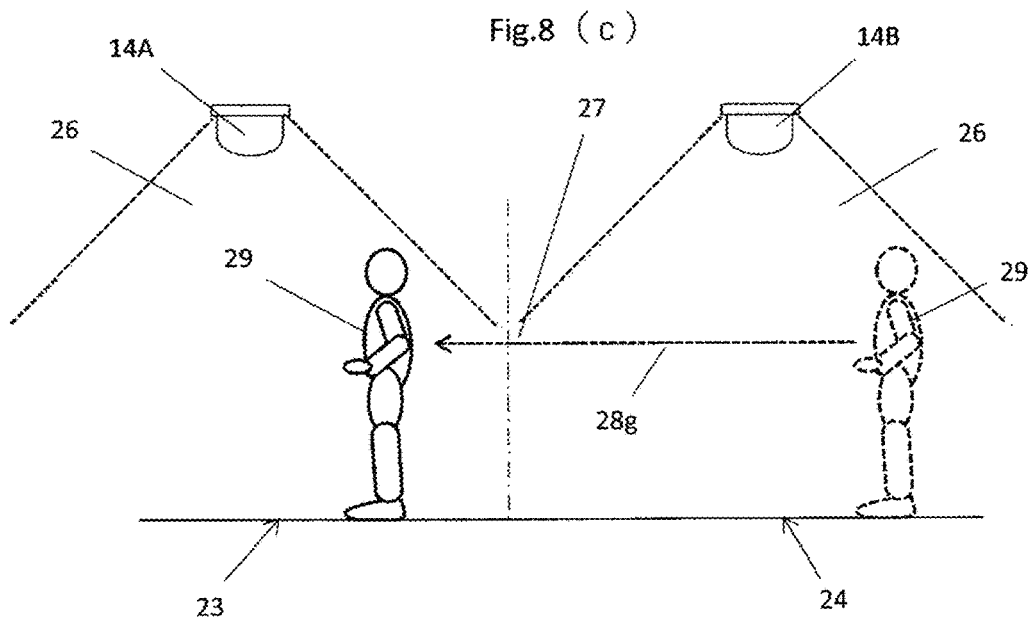

Further, in the configuration illustrated in FIG. 7, two types of detection intervals, the "long" and "short" states, are available, but various types of detection intervals of the detection means may be set. For example, when a detection interval of a "middle" state of 5 to 9 seconds is defined, and the first detection means have its detection interval set to the "short" state, the second detection means associated with the first detection means can have its detection interval set to the "middle" state.

The processing performed by the detection condition setting unit 12 allows the plurality of detection means 14 to detect the person in the security area 23 or the warning area 24 while changing the detection interval, so that the position and movement direction of the person can be more accurately recognized.

The above-described processing performed by the person detection position recognition unit 11 allows the position of a certain person in the security area 23 or the warning area 24 to be recognized, and the processing performed by the detection condition setting unit 12 allows the movement path of the person to be confirmed with a detection frequency of the detection means 14 increased.

Figure 12:
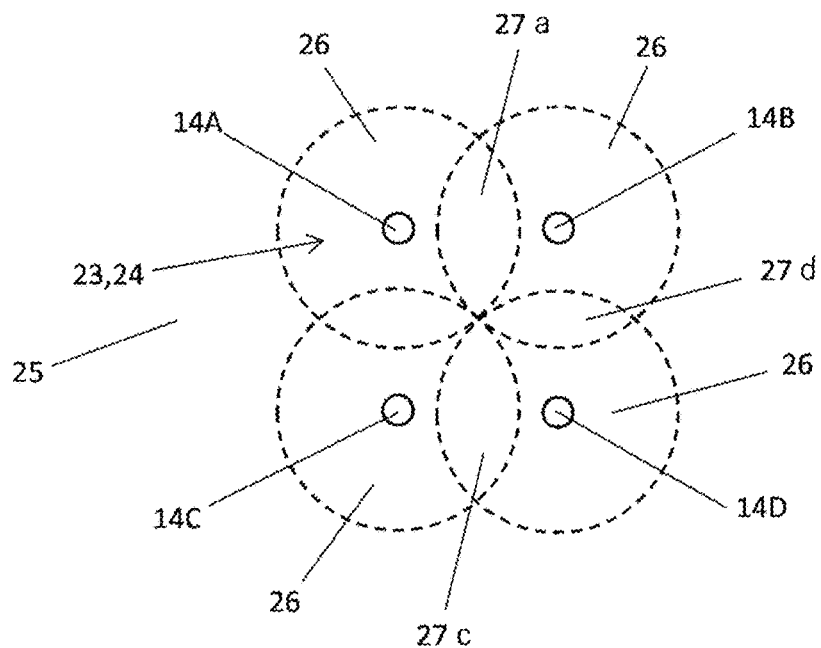
FIGS. 12(a) and 12(b) are conceptual diagrams for describing an application example of the security device according to the present invention.
Figure 12:
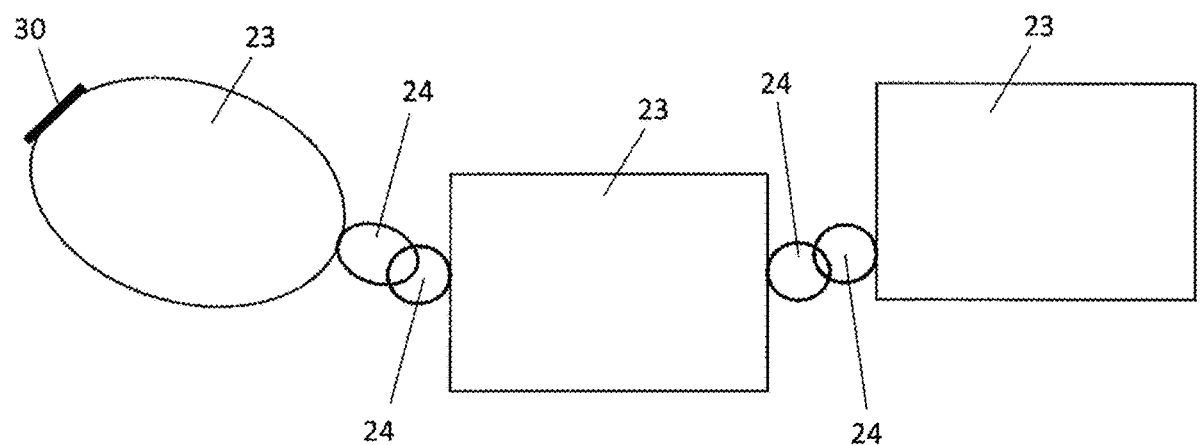

For example, as illustrated in FIG. 12(a), the security device 1A that includes the plurality of detection means 14 to form a plurality of overlapping detection ranges 27 is installed in the security area 23 and/or the warning area 24, and the person detection position recognition unit 11 and the detection condition setting unit 12 perform their respective processing, so that it is possible to recognize of which detection means 14 the certain person is present within the detection range 26 and how the certain person moves.

When the comparison performed by the detection order comparison unit 9 shows that the detection order of the detection means 14 that have detected the person coincides with the security-activation or security-deactivation detection order of the detection means, the security status control unit 13 controls the security status of the security target 22 from the security-deactivated status to the security-activated status or from the security-activated status to the security-deactivated status.

As described above, according to the present embodiment, a building such as a house, an office (business office), a public facility, or an entertainment facility, a structure such as a shrine, a temple, or a greenhouse, or a movable property such as a vehicle including an automobile, a bicycle, and an armored cash transport car, or a ship including a yacht and a boat is set as the security target, and the security device can be installed in the security area and/or the warning area defined for the security target. This makes it possible to perform not only conventional detection of whether a suspicious person has intruded into a building, but also detection of whether the suspicious person has intruded into the warning area defined outside the building.

Further, the above-described determination processing on the security status of the security target facilitates the confirmation of whether a suspicious person has intruded from the warning area into the security area, and allows the security status of the security target to be automatically controlled to the security-activated status based on various detection patterns of the detection means, so that it is possible to prevent the activation of security from being forgotten and make security higher.

2. Second Embodiment of Security Device

Figure 2:
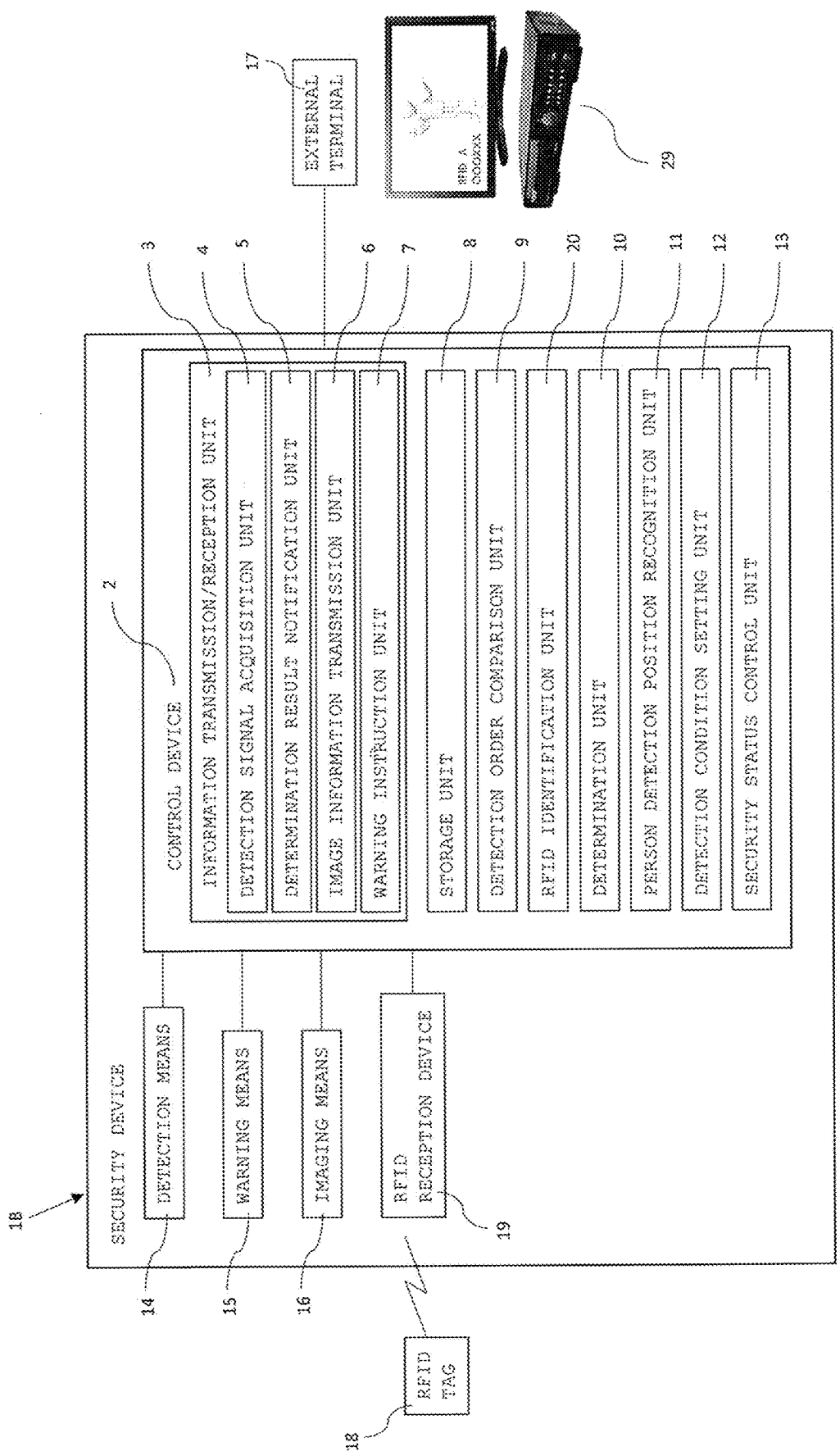
FIG. 2 is a diagram illustrating another example of the configuration of the security device according to the present invention.

A security device 1B illustrated in FIG. 2 includes an RFID reception device 19 having a reader/writer function in addition to the components of the security device 1A illustrated in FIG. 1. Further, the control device 2 of the security device 1B includes an RFID identification unit 20 in addition to the components of the control device 2 of the security device 1A illustrated in FIG. 1. The same components as the components of the security device 1A illustrated in FIG. 1 are denoted by the same reference numerals, and no description will be given below of such components.

The RFID reception device 19 communicates with the RFID tag 18 over radio waves and receives identification information transmitted by an RFID tag 18. To the communication system of the communications with the RFID tag 18, an active mode or a passive mode is applicable. A communication distance may be several 10 m for both of the modes.

In the configuration illustrated in FIG. 2, the RFID reception device 19 is provided within the security device 1B, or alternatively, may be provided separately from the security device 1B and attached to the security device 1B. Further, the RFID reception device 19 may be provided for each detection means 14.

The storage unit 8 stores RFID identification information for use in verification that is used by the RFID identification unit 20 to identify the RFID tag 18.

The RFID identification unit 20 performs processing of identifying the RFID tag 18 by searching the RFID identification information for use in verification stored in the storage unit 8 for identification information that coincides with the identification information on the RFID tag 18 received by the RFID reception device 19.

The determination unit 10 performs the following determination processing in addition to the above-described determination processing 1.

(Determination Processing 2)

A determination is performed as to whether a suspicious person has intruded into the security target 22 based on whether the detection means 14 has detected a person within the detection range 26 and whether the RFID reception device 19 has received the identification information on the RFID tag 18 or whether the RFID identification unit 20 has identified the RFID tag 18.

In the configuration illustrated in FIG. 9(a), the storage unit 8 stores information on the security-deactivation detection order of the detection means indicating "first: the detection means 14A", and information on the security-activation detection order of the detection means "first: the detection means 14B, second: the detection means 14A".

In FIG. 9(a), when the security status of the security target 22 is set to the security-activated status, and a user 29 moves to the warning area 24 with the RFID tag 18, the detection means 14A detects the user 29. Further, the RFID reception device 19A receives the identification information on the RFID 18, and the RFID identification unit 20 performs processing of identifying the RFID tag 18.

When the above-described comparison processing performed by the detection order comparison unit 9 shows that the detection order of the detection means 14 that have detected the user 29 coincides with the security-deactivation detection order of the detection means prestored in the storage unit 8, and the RFID identification unit 20 has identified the RFID 18 based on the identification information on the RFID tag 18 received by the RFID reception device 19, the determination unit 10 determines that there is no abnormality in entry processing based on the result of the comparison performed by the detection order comparison unit 9 and the result of the recognition processing on the RFID 18 performed by the RFID identification unit 20. In this case, the security status control unit 13 performs processing of setting the security status of the security target 22 to the security-deactivated status.

After the security is deactivated, the position of the user 29 in the security area 23 or the warning area 24 can be recognized through the above-described processing performed by the person detection position recognition unit 11, and the movement path of the user 29 can be confirmed through the processing of increasing the detection frequency of the detection means 14 performed by the detection condition setting unit 12.

Further, the determination result notification unit 5 notifies the external terminal 17 of the result of the determination performed by the determination unit 10 that there is no abnormality in entry processing, and the image information transmission unit 6 transmits, to the external terminal 17, the image information containing the still image or moving image obtained as a result of capturing the security area 23 and the warning area 24 of the security target 22 by the imaging means 16, so that the security service provider who owns and uses the external terminal 17 can know the security status of the security target 22.

Note that when the image information transmission unit 6 transmits the image information to the external terminal 17, the identification information on the RFID tag 18 may be associated with the image information. In this case, as illustrated in FIG. 2, the identification information on the RFID tag 18 is displayed together with the image captured by the user 29 using the external terminal 17, so that the service provider can confirm the owner of the RFID tag 18.

For example, as illustrated in FIG. 12(b), in a facility having a plurality of security areas 23, when the security device 1B including the detection means 14 and the RFID reception device 19 installed in each security area 23 and the warning area 24 defined between the security areas 23, 23, and the determination processing by the determination unit 10, the processing by the person detection position recognition unit 11, and the processing by the detection condition setting unit 12 are performed, it is possible to recognize of which detection means 14 a person who has entered from an entrance gate 30 is present within the detection range 26 or how the person moves, and the identification information on the RFID tag 18 is displayed together with the image captured by the user 29 using the external terminal 17, so that the service provider can confirm the owner of the RFID tag 18.

Figure 9:
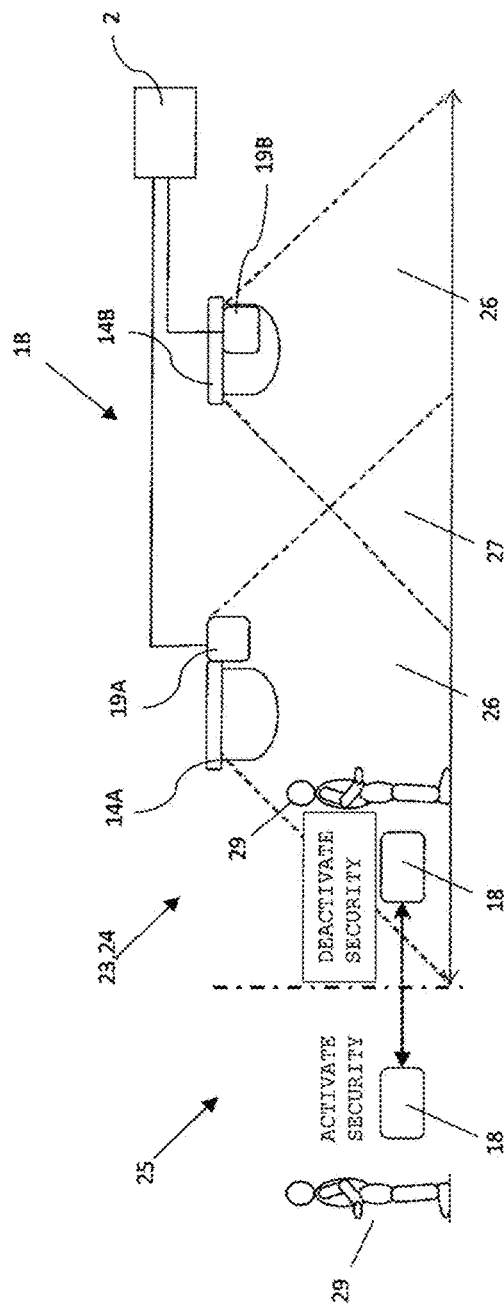
FIGS. 9(a) to 9(c) are diagrams illustrating an example of a state where the security target is placed under security using the security device illustrated in FIG. 2.
Figure 9:
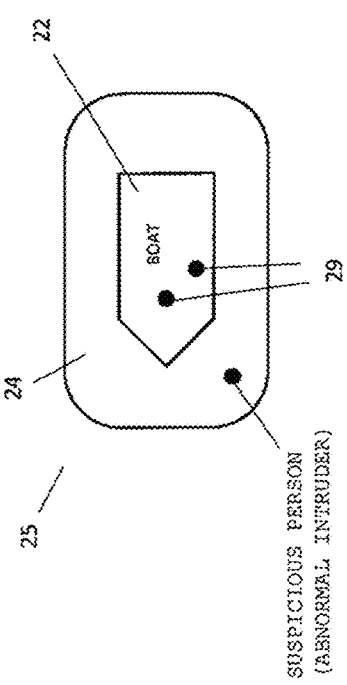
Figure 9:
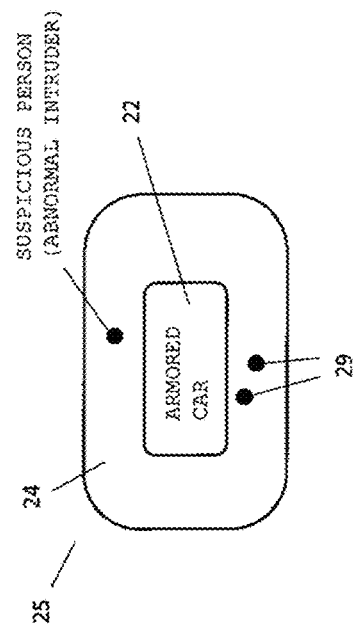

With the security status of the security target 22 set to the security-deactivated status as illustrated in FIG. 9(*a*), when the user 29 moves from the warning area 24 to the non-warning area 25, the user 29 is detected in the order of the detection range 26 of the detection means 14B and the detection range 26 of the detection means 14A. When the above-described comparison processing performed by the detection order comparison unit 9 shows that the detection order of the detection means that have detected the user 29 coincides with the security-activation detection order of the detection means prestored in the storage unit 8, and the RFID tag 18 is located outside the communication range of the RFID reception device 19, the determination unit 10 determines that there is no abnormality in exit processing based on the result of the comparison performed by the detection order comparison unit 9 and the result of the recognition processing on the RFID tag 18 performed by the RFID reception device 19. In this case, the security status control unit 13 performs processing of setting the security status of the security target 22 to the security-activated status.

On the other hand, with the security status of the security target 22 set to the security-activated status, the determination unit 10 determines that there is an intrusion abnormality in the following cases.

(1) A case where, with the security status of the security target 22 set to the security-activated status, the comparison performed by the detection order comparison unit 9 shows that the detection order of the detection means 14 that have detected a person does not coincide with the security-deactivation detection order of the detection means stored in the storage unit 8.

This corresponds to a case where the person has intruded into the security area 23 or the warning area 24 through one of a plurality of intrusion paths. For example, this corresponds to a case where, in the configuration illustrated in FIG. 9(*a*), the person has been detected not on the path corresponding to the security-deactivation detection order of the detection means "first: the detection means 14A" but in the detection range 26 of the detection means 14B.

(2) A case where, with the security status of the security target 22 set to the security-activated status, the comparison performed by the detection order comparison unit 9 shows that the detection order of the detection means 14 that have detected the person coincides with the security-deactivation detection order of the detection means stored in the storage unit 8, but the RFID reception device 19 has not received the identification information on the RFID tag 18.

This corresponds to a case where the person carries no RFID tag 18.

(3) A case where the comparison performed by the detection order comparison unit 9 shows that the detection order of the detection means 14 that have detected the person coincides with the security-deactivation detection order of the detection means stored in the storage unit 8, but the RFID identification unit 20 has failed to identify the RFID tag 18.

This corresponds to a case where the person carries the RFID tag 18, but the communications with the RFID reception device 19 have failed.

(4) A case where, with the security status of the security target 22 set to the security-deactivated status, the RFID reception device 19 has not received the identification information on the RFID tag 18, and the comparison performed by the detection order comparison unit 9 shows that the detection order of the detection means 14 that have detected the person does not coincide with the security-activation detection order of the detection means stored in the storage unit 8.

This corresponds to a case where the person has intruded into the security area 23 or the warning area 24 through one of the plurality of intrusion paths, and the person carries no RFID 18. For example, this corresponds to a case where, with the security status of the security target 22 (a boat or an armored cash transport car) illustrated in FIGS. 9(*b*) and 9(*c*) set to the security-deactivated status, a suspicious person has intruded into the warning area 24 without carrying the RFID tag 18, and the detection means 14 have detected the suspicious person.

When it is determined that there is an intrusion abnormality, it is possible to recognize the position of the suspicious person in the security area 23 or the warning area 24 through the above-described processing performed by the person detection position recognition unit 11 or to track the suspicious person with the detection frequency of the detection means 14 increased through the processing performed by the detection condition setting unit 12.

Further, the determination result notification unit 5 notifies the external terminal 17 of the result of the determination performed by the determination unit 10 that there is an intrusion abnormality, and the image information transmission unit 6 transmits, to the external terminal 17, the image information containing the still image or moving image obtained as a result of capturing the security area 23 and the warning area 24 of the security target 22 by the imaging means 16, so that the user or the security service provider who owns and uses the external terminal 17 can immediately know the security status of the security target 22 and can take a corresponding measure.

Further, when the result of the determination performed by the determination unit 10 shows that there is an intrusion abnormality, the warning instruction unit 7 instructs the warning means 15 to provide notification of the above-described abnormality. The warning means 15 provides notification of the abnormality as described above.

As described above, according to the present embodiment as well, a building such as a house, an office (business office), a public facility, or an entertainment facility, a structure such as a shrine, a temple, or a greenhouse, or a movable property such as a vehicle including an automobile, a bicycle, and an armored cash transport car, or a ship including a yacht and a boat is set as the security target, and the security device can be installed in the security area and/or the warning area defined for the security target. This makes it possible to perform not only conventional detection of whether a suspicious person has intruded into a building, but also detection of whether the suspicious person has intruded into the warning area defined outside the building.

Further, the above-described determination processing on the security status of the security target facilitates the confirmation of whether a suspicious person has intruded from the warning area into the security area, and allows the security status of the security target to be automatically controlled to the security-activated status based on various detection patterns of the detection means, so that it is possible to prevent the activation of security from being forgotten and make security higher.

[Security Processing by Security Device]

A flow of security processing of the security device 1A illustrated in FIG. 1 and a flow of security processing of the security device 1B illustrated in FIG. 2 will be described with reference to FIGS. 8 to 11.

1. Security Processing Pattern A

In a security processing pattern A illustrated in FIGS. 8(b) and 10(a), the determination unit 10 performs the above-described determination processing 1.

(S101) With a house set as the security target 22, the security device 1A (not illustrated) and the detection means 14A are installed in the house that is the security area 23, the detection means 14B is installed at an entrance that is the warning area 24, and the security status of the security target 22 is set to the security-deactivated status. Further, the storage unit 8 of the security device 1A stores information on the security-activation detection order of the detection means indicating "first: the detection means 14A, second: the detection means 14B".

(S102) The detection means 14A, 14B detect a family member (user 29) in their respective detection ranges 26.

(S103) The detection order comparison unit 9 performs a comparison to determine whether the detection order of the detection means 14 that have detected the user 29 coincides with the security-activation detection order of the detection means stored in the storage unit 8.

(S104) When the user 29 goes out and moves on a movement path 28f through the security area 23 and the warning area 24, the user 29 is detected in the order of the detection range 26 of the detection means 14A, the overlapping detection range 27 between the detection means 14A and the detection means 14B, and the detection range 26 of the detection means 14B.

Because a result of the comparison processing on the detection order performed by the detection order comparison unit 9 shows that the detection order of the detection means 14 that have detected the user 29 on the movement path 28f coincides with the security-activation detection order of the detection means stored in the storage unit 8, the determination unit 10 determines that there is no abnormality in exit processing.

The security status control unit 13 performs processing of setting the security status of the security target 22 to the security-activated status (for example, transition to a monitoring mode by the external terminal 17). Subsequently, the processing proceeds to a security processing pattern B to be described later.

(S105) On the other hand, in FIG. 8(b), when a suspicious person intrudes into the house, the suspicious person is detected in the order of the detection range 26 of the detection means 14B, the overlapping detection range 27 between the detection means 14A and the detection means 14B, and the detection range 26 of the detection means 14A.

Because a result of the comparison processing on the detection order performed by the detection order comparison unit 9 shows that the detection order of the detection means 14 that have detected the suspicious person does not coincide with the security-activation detection order of the detection means stored in the storage unit 8, the determination unit 10 determines that there is an intrusion abnormality.

The determination result notification unit 5 notifies the external terminal 17 of the result of the determination performed by the determination unit 10. Further, the image information transmission unit 6 transmits, to the external terminal 17, image information containing the still image or moving image obtained as a result of capturing the security status of the security area 23 and warning area 24 of the security target 22 by the imaging means 16. The user or the security service provider who owns and uses the external terminal 17 can know the security status of the security target 22 and can take a corresponding measure.

(S106) The warning instruction unit 7 instructs the warning means 15 to output a warning. The warning buzzer sounds a warning, and the light emitting device emits light, so as to provide notification of the abnormality. In addition, the position of the suspicious person in the security area 23 or the warning area 24 is recognized through the above-described processing performed by the person detection position recognition unit 11, and the detection frequency of the detection means 14 is increased through the processing performed by the detection condition setting unit 12, so as to track the suspicious person.

2. Security Processing Pattern B

Also in a security processing pattern B illustrated in FIGS. 8(c) and 10(b), the determination unit 10 performs the above-described determination processing 1. The storage unit 8 of the security device 1A stores information on the security-deactivation detection order of the detection means indicating "first: the detection means 14B, second: the detection means 14A". The security status of the security target 22 is set to the security-activated status in the above-described S104.

(S107) The detection means 14A, 14B detect a family member (user 29) in their respective detection ranges 26.

(S108) The detection order comparison unit 9 performs a comparison to determine whether the detection order of the detection means 14 that have detected the user 29 coincides with the security-deactivation detection order of the detection means stored in the storage unit 8.

(S109) When the user 29 comes back home and moves on a movement path 28g through the security area 23 and the warning area 24, the user 29 is detected in the order of the detection range 26 of the detection means 14B, the overlapping detection range 27 between the detection means 14A and the detection means 14B, and the detection range 26 of the detection means 14A.

Because a result of the comparison processing on the detection order performed by the detection order comparison unit 9 shows that the detection order of the detection means 14 that have detected the user 29 on the movement path 28g coincides with the security-deactivation detection order of the detection means stored in the storage unit 8, the determination unit 10 determines that there is no abnormality in entry processing.

The security status control unit 13 performs processing of setting the security status of the security target 22 to the security-deactivated status (for example, clear the monitoring mode by the external terminal 17). Subsequently, the processing proceeds to the above-described security processing pattern A.

(S110) On the other hand, when the suspicious person remains in the warning area 24 (for example, a state where the suspicious person is loitering in the warning area 24), the detection means 14B detects the suspicious person, and when the suspicious person intrudes into the security area 23 without being detected by the detection means 14B, the detection means 14A detects the suspicious person. Because a result of the comparison processing on the detection order performed by the detection order comparison unit 9 shows that the detection order of the detection means 14 that have detected the suspicious person does not coincide with the security-deactivation detection order of the detection means stored in the storage unit 8, the determination unit 10 determines that there is an intrusion abnormality.

The determination result notification unit 5 notifies the external terminal 17 of the result of the determination performed by the determination unit 10. Further, the image information transmission unit 6 transmits, to the external terminal 17, image information containing the still image or moving image obtained as a result of capturing the security status of the security area 23 and warning area 24 of the security target 22 by the imaging means 16. The user or the security service provider who owns and uses the external terminal 17 can know the security status of the security target 22 and can take a corresponding measure.

(S111) The warning instruction unit 7 instructs the warning means 15 to output a warning. The warning buzzer sounds a warning, and the light emitting device emits light, so as to provide notification of the abnormality. In addition, the position of the suspicious person in the security area 23 or the warning area 24 is recognized through the above-described processing performed by the person detection position recognition unit 11, and the detection frequency of the detection means 14 is increased through the processing performed by the detection condition setting unit 12, so as to track the suspicious person.

3. Security Processing Pattern C

Figure 11:
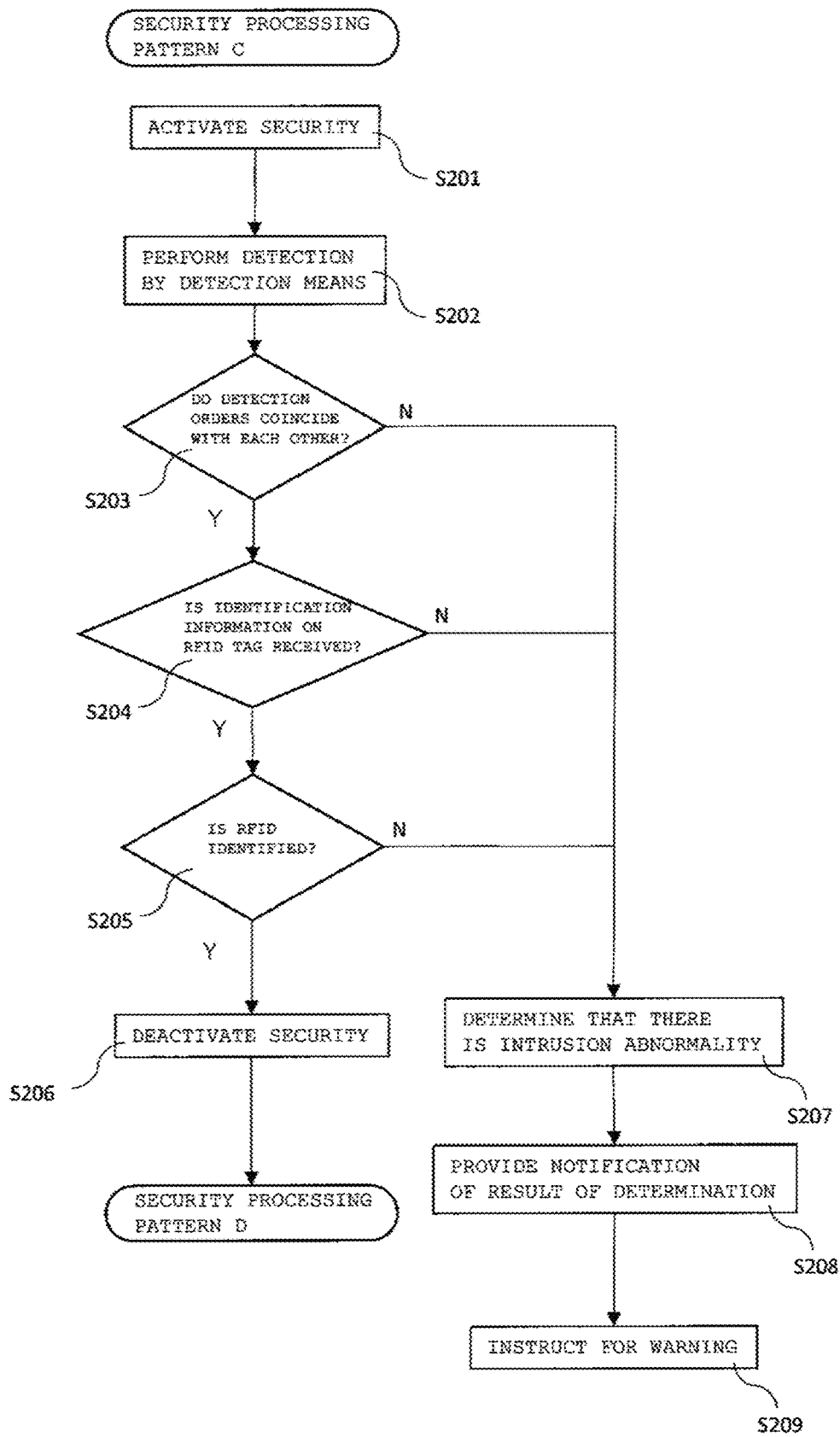
FIG. 11(a) is a flowchart illustrating an example of security processing performed by the security device illustrated in FIG. 2.
FIG. 11(b) is a flowchart illustrating another example of the security processing performed by the security device illustrated in FIG. 2.
Figure 11:
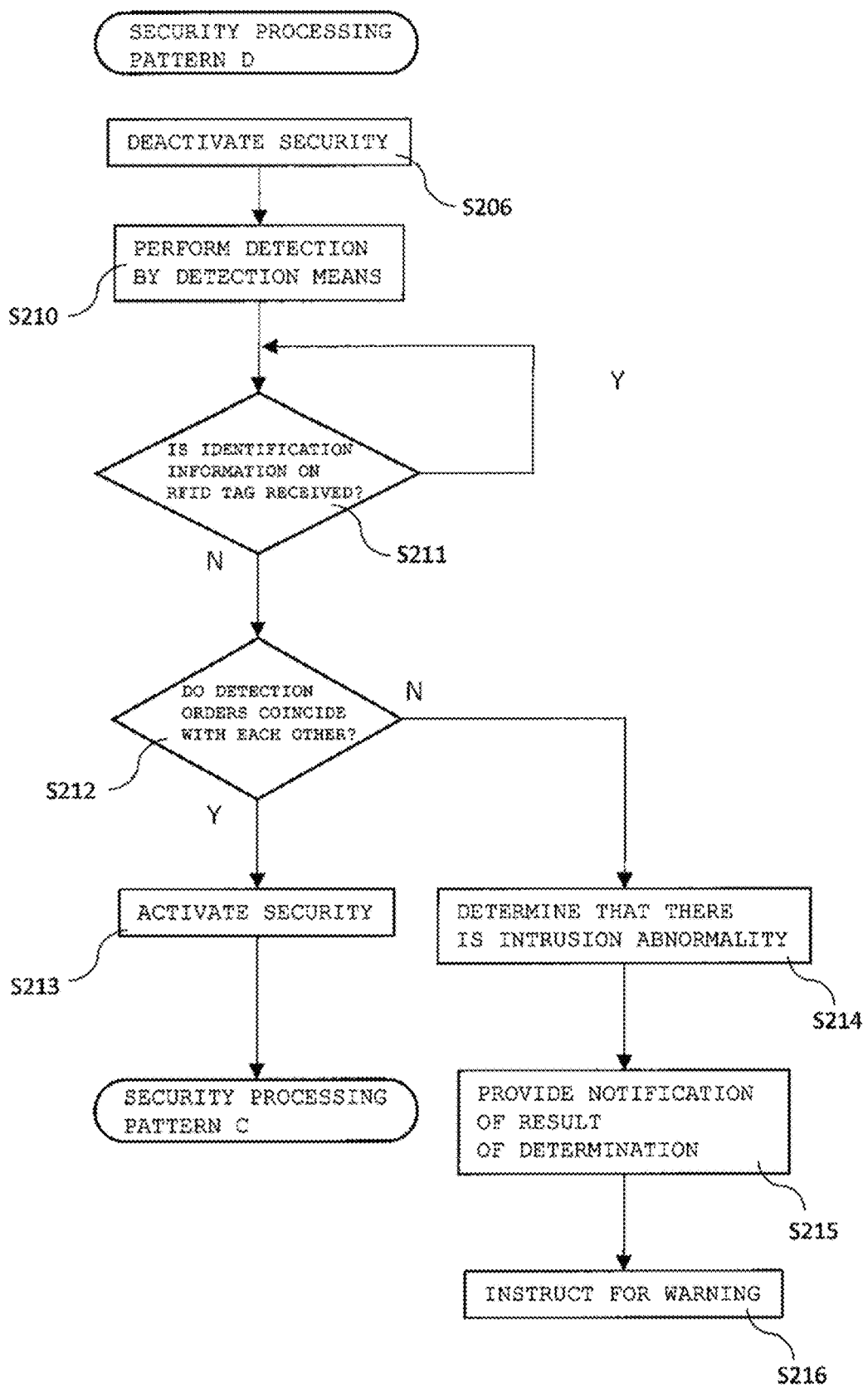

In a security processing pattern C illustrated in FIGS. 9 and 11(*a*), the determination unit 10 performs determination processing 2.

(S201) A ship such as a yacht or a boat is set as the security target 22, the detection means 14A, 14B illustrated in FIG. 4(*a*) and the security device 1B including RFID reception devices 19A, 19B are installed at an anchorage that is the warning area 24, and the security status of the security target 22 is set to the security-activated status. Further, the owner (user 29) of the ship such as a yacht or a boat carries the RFID tag 18. The storage unit 8 of the security device 1B stores information on the security-deactivation detection order of the detection means "first: the detection means 14A".

(S202) The detection means 14A, 14B detect the user 29 in their respective detection ranges 26.

(S203) The detection order comparison unit 9 performs a comparison to determine whether the detection order of the detection means 14 that have detected the user 29 coincides with the security-deactivation detection order of the detection means stored in the storage unit 8.

(S204) When the comparison performed by the detection order comparison unit 9 shows that the detection order of the detection means 14 that have detected the user 29 coincides with the security-deactivation detection order of the detection means stored in the storage unit 8 (S203: Y), the RFID identification device 19 performs processing of receiving the identification information on the RFID tag 18. In the configuration illustrated in FIG. 9(*a*), the RFID identification device 19A performs processing of receiving the identification information on the RFID tag 18.

(S205) When the RFID identification device 19A receives the identification information on the RFID 18 (S204: Y), the RFID identification unit 20 performs processing of identifying the RFID tag 18 by searching the RFID identification information for use in verification stored in the storage unit 8 for identification information that coincides with the identification information on the RFID tag 18 received by the RFID reception device 19A.

(S206) When the RFID identification unit 20 identifies the RFID 18 based on the identification information on the RFID tag 18 received by the RFID reception device 19A (S205: Y), the determination unit 10 determines that there is no abnormality in entry processing based on the result of the comparison performed by the detection order comparison unit 9 and the result of the recognition processing on the RFID 18 performed by the RFID identification unit 20. In this case, the security status control unit 13 performs processing of setting the security status of the security target 22 to the security-deactivated status. Subsequently, the processing proceeds to a security processing pattern D to be described later.

After the security is deactivated, the position of the user 29 in the security area 23 or the warning area 24 can be recognized through the above-described processing performed by the person detection position recognition unit 11, and the movement path of the user 29 can be confirmed through the processing of increasing the detection frequency of the detection means 14 performed by the detection condition setting unit 12.

Further, the determination result notification unit 5 notifies the external terminal 17 of the result of the determination performed by the determination unit 10 that there is no abnormality in entry processing, and the image information transmission unit 6 transmits, to the external terminal 17, the identification information on the RFID tag 18 with the identification information on the RFID tag 18 associated with the image information containing the still image or moving image obtained as a result of capturing the security status of the security area 23 and warning area 24 of the security target 22 by the imaging means 16, so that the security service provider who owns and uses the external terminal 17 can know the security status of the security target 22 and can confirm the owner of the RFID tag 18.

(S207) On the other hand, with the security status of the security target 22 set to the security-activated status, the determination unit 10 determines that there is an intrusion abnormality in the following cases.

(1) A case where the comparison performed by the detection order comparison unit 9 shows that the detection order of the detection means 14 that have detected the person does not coincide with the security-deactivation detection order of the detection means stored in the storage unit 8 (S203: N).

This corresponds to a case where the person has been detected in the detection range 26 of the detection means 14B, that is, a case where the person has intruded into the warning area 24 through one of the plurality of intrusion paths.

(2) A case where the comparison performed by the detection order comparison unit 9 shows that the detection order of the detection means 14 that have detected the person coincides with the security-deactivation detection order of the detection means stored in the storage unit 8, but the RFID reception device 19 has not received the identification information on the RFID tag 18 (S203: Y, S204: N).

This corresponds to a case where the person carries no RFID tag 18.

(3) A case where the comparison performed by the detection order comparison unit 9 shows that the detection order of the detection means 14 that have detected the person coincides with the security-deactivation detection order of the detection means stored in the storage unit 8, but the RFID identification unit 20 has failed to identify the RFID tag 18 (S203: Y, S204: Y, S205: N).

This corresponds to a case where the person carries the RFID tag 18, but the communications with the RFID reception device 19 have failed.

(S208) The determination result notification unit 5 notifies the external terminal 17 of the result of the determination performed by the determination unit 10. Further, the image information transmission unit 6 transmits, to the external terminal 17, image information containing the still image or moving image obtained as a result of capturing the security status of the security area 23 and warning area 24 of the security target 22 by the imaging means 16. The user or the security service provider who owns and uses the external terminal 17 can know the security status of the security target 22 and can take a corresponding measure.

(S209) The warning instruction unit 7 instructs the warning means 15 to output a warning. The warning buzzer sounds a warning, and the light emitting device emits light, so as to provide notification of the abnormality. In addition, the position of the suspicious person in the warning area 24 is recognized through the above-described processing performed by the person detection position recognition unit 11, and the detection frequency of the detection means 14 is increased through the processing performed by the detection condition setting unit 12, so as to track the suspicious person.

4. Security Processing Pattern D

Also in the security processing pattern D illustrated in FIGS. 9 and 11(b), the determination unit 10 performs the above-described determination processing 2. The storage unit 8 of the security device 1B stores information on the security-activation detection order of the detection means indicating "first: the detection means 14A, second: the detection means 14B". The security status of the security target 22 is set to the security-deactivated status in the above-described S206.

(S210) The detection means 14A, 14B detect the user 29 in their respective detection ranges 26.

(S211) The RFID identification device 19 performs processing of receiving the identification information on the RFID tag 18.

(S212) When the RFID identification device 19A has not received the identification information on the RFID 18 because the user 29 has left (S211: N), that is, when the user 29 has moved from the warning area 24 to the non-warning area 25 to bring the RFID tag 18 outside the communication range of the RFID reception device 19A, the detection order comparison unit 9 performs a comparison to determine whether the detection order of the detection means 14 that have detected the user 29 coincides with the security-activation detection order of the detection means stored in the storage unit 8.

(S213) When the comparison performed by the detection order comparison unit 9 shows that the detection order of the detection means 14 that have detected the user 29 coincides with the security-activation detection order of the detection means stored in the storage unit 8 (S212: Y), the determination unit 10 determines that there is no abnormality in exit processing based on the result of the comparison performed by the detection order comparison unit 9 and the result of the processing of receiving the RFID tag 18 performed by the RFID reception device 19A. In this case, the security status control unit 13 performs processing of setting the security status of the security target 22 to the security-activated status. Subsequently, the processing proceeds to the security processing pattern C.

(S214) On the other hand, with the security status of the security target 22 set to the security-activated status, the determination unit 10 determines that there is an intrusion abnormality in the following case.

A case where the RFID reception device 19 has not received the identification information on the RFID tag 18 (S211: N), and the comparison performed by the detection order comparison unit 9 shows that the detection order of the detection means 14 that have detected the person does not coincide with the security-activation detection order of the detection means stored in the storage unit 8 (S212: N)

This corresponds to a case where the person has intruded into the security area 23 or the warning area 24 through one of the plurality of intrusion paths, and the person carries no RFID 18. For example, this corresponds to a case where, with the security status of the security target 22 (a boat or an armored cash transport car) illustrated in FIGS. 9(b) and 9(c) set to the security-deactivated status, a suspicious person has intruded into the warning area 24 without carrying the RFID tag 18, and the detection means 14 have detected the suspicious person.

(S215) The determination result notification unit 5 notifies the external terminal 17 of the result of the determination performed by the determination unit 10. Further, the image information transmission unit 6 transmits, to the external terminal 17, image information containing the still image or moving image obtained as a result of capturing the security status of the security area 23 and warning area 24 of the security target 22 by the imaging means 16. The user or the security service provider who owns and uses the external terminal 17 can know the security status of the security target 22 and can take a corresponding measure.

(S216) The warning instruction unit 7 instructs the warning means 15 to output a warning. The warning buzzer sounds a warning, and the light emitting device emits light, so as to provide notification of the abnormality. In addition, the position of the suspicious person in the warning area 24 is recognized through the above-described processing performed by the person detection position recognition unit 11, and the detection frequency of the detection means 14 is increased through the processing performed by the detection condition setting unit 12, so as to track the suspicious person.

[Security System]

A security system according to the present embodiment is a security system that controls a security status of a security target to a security-activated or security-deactivated status based on whether a person has been detected within a detection range of a detection means that detects a person and whether an RFID reception device has received identification information on an RFID or whether the RFID reception device has identified the RFID tag.

Figure 13:
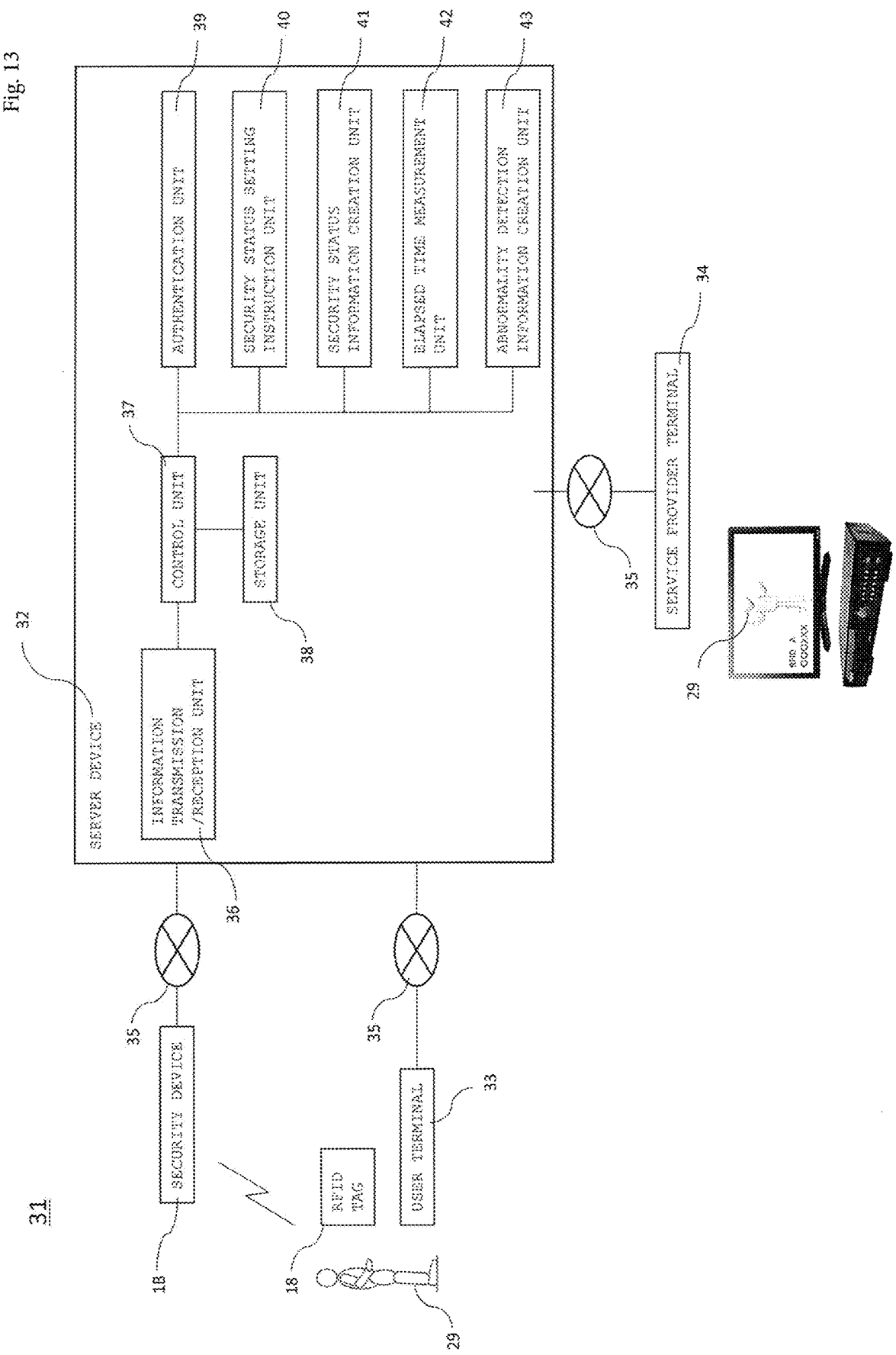
FIG. 13 is a diagram illustrating an example of a configuration of a security system according to the present invention.

A security system 31 illustrated in FIG. 13 includes a server device 32 installed by the security service provider, the security device 1B illustrated in FIG. 2, a user terminal 33 such as a smartphone, a tablet terminal, a personal computer, or a mobile phone used by the user 29 related to the security target 22, and a service provider terminal 34 such as a smartphone, a tablet terminal, a personal computer, or a mobile phone used by the security service provider. The same components as the components of the security device 1B illustrated in FIG. 2 are denoted by the same reference numerals, and no description will be given below of such components.

The security device 1B, the user terminal 33, and the service provider terminal 34 are communicatively connected to the server device 32 over a communication network 35 such as the Internet, a radio communication network adhering to a radio communication standard, or a wired communication network adhering to a wired communication standard.

As illustrated in FIG. 13, the server device 32 includes an information transmission/reception unit 36, a control unit 37, a storage unit 38, an authentication unit 39, a security status setting instruction unit 40, a security status information creation unit 41, an elapsed time measurement unit 42, and an abnormality detection information creation unit 43.

The information transmission/reception unit 36 transmits and receives information to and from the security device 1B, the user terminal 33, and the service provider terminal 34.

The authentication unit 39 acquires, from the user terminal 33, an authentication request for instructing the security device 1B to set the security status of the security target 22 to the security-activated or security-deactivated status and performs authentication processing. This authentication processing is performed using a known authentication technology.

The security status setting instruction unit 40 performs processing of causing the user terminal 33 that has succeeded in authentication to make a selection for the security status of the security target 22. A predetermined selection screen is displayed on the user terminal 33 to allow selection between the security-activated status and the security-deactivated status for the security status of the security target 22.

The security status information creation unit 41 performs processing of creating security status information based on the security status of the security target 22 selected by the user terminal 33 or the security status of the security target 22 set by the security device 1B.

For example, as shown in Table 1, when the security status setting instruction unit 40 performs processing of causing the user terminal 33 that has succeeded in authentication to make a selection for the security status of the security target 22, and the user terminal 33 selects the security-deactivated status for the security status of the security target 22 set to the security-activated status, the security status information creation unit 41 creates security status information in which a flag "1" indicating that the security status of the security target 22 is a standby status for security deactivation is associated with selection instruction information (instruction for selection of the security-deactivated status) from the user terminal 33 and transmits the security status information to the security device 1B.

In this case, the security target 22 is under security by the security device 1B, but the security target 22 is in a standby status where the security-deactivated status can be set by identifying the RFID tag 18 held by the user 29.

Further, when the security status control unit 13 of the security device 1B sets the security status of the security target 22 to the security-deactivated status through the above-described determination processing 2 performed by the determination unit 10 of the security device 1B (FIG. 11: S206), the security status information creation unit 41 creates the security status information in which a flag "1" indicating that the security status of the security target 22 is switched from the security-activated status to the security-deactivated status is associated with setting processing information (setting of the security-deactivated status) of the security device 1B and transmits the security status information to the security device 1B.

TABLE 1

| Information processing | Security status | Flag |
|---|---|---|
| Security activation | Security-activated | 0 |
| Security deactivation setting instruction from user terminal | Security-activated (standby for security deactivation) | 1 |
| RFID tag is identified | Security-deactivated | 1 |
| RFID tag is not identified | Security-activated | 0 |

The storage unit 38 stores information on authentication such as an ID and a password of the user 29 necessary for the authentication unit 39 to authenticate the user terminal 33, the security status information created by the security status information creation unit 41, the result of the determination performed by the determination unit 10 transmitted from the security device 1B, information on the security state of the security target 22 (image information obtained by the imaging means 16), and the like.

When the security status setting instruction unit 40 performs processing of causing the user terminal 33 that has succeeded in authentication to make a selection for the security status of the security target 22, and the user terminal 33 selects the security-deactivated status for the security status of the security target 22 set to the security-activated status, the elapsed time measurement unit 42 measures a time elapsed from the selection and determines whether a predetermined time (for example, 10 minutes) has elapsed. This is to cancel the above-described standby status where the security status of the security target 22 can be set to the security-deactivated status.

When the elapsed time measurement unit 42 determines that the predetermined time has elapsed, that is, when the RFID 18 held by the user 29 has not been identified, the security status control unit 13 of the security device 1B maintains the security status of the security target 22 in the security-activated status, and the security status information creation unit 41 creates security status information in which a flag "0" indicating that the standby status where the security status of the security target 22 can be set to the security-deactivated status has been canceled is associated with the setting processing information of the security device 1B and transmits the security status information to the security device 1B.

When the elapsed time measurement unit 42 determines that the predetermined time has not elapsed, that is, when the user 29 has come to the warning area 24 with the RFID tag 18, the determination unit 10 of the security device 1B determines the security status of the security target 22 in accordance with the above-described security processing pattern C.

As a result, when it is determined that there is no abnormality in entry processing, the security status control unit 13 of the security device 1B sets the security status of the security target 22 to the security-deactivated status based on the security status information acquired from the server device 32.

The abnormality detection information creation unit 43 performs processing of creating abnormality detection information for use in notification of an abnormality detected in the security target 22 based on the result of the determination performed by the determination unit 10 transmitted from the security device 1B. The abnormality detection information thus created is transmitted to the user terminal 33 and the service provider terminal 34.

The user 29 and the security service provider can immediately know the security status of the security target 22 based on the abnormality detection information thus transmitted and can take a corresponding measure.

The processing performed by each unit is controlled by the control unit 37 including a CPU, a RAM, a ROM, and the like.

As described above, according to the present embodiment, a building such as a house, an office (business office), a public facility, or an entertainment facility, a structure such as a shrine, a temple, or a greenhouse, or a movable property such as a vehicle including an automobile, a bicycle, and an armored cash transport car, or a ship including a yacht and a boat is defined as the security target, and the security system can be constructed in the security area and/or the warning area defined for the security target. This makes it possible to perform not only conventional detection of whether a suspicious person has intruded into a building, but also detection of whether the suspicious person has intruded into the warning area defined outside the building.

Further, the above-described determination processing on the security status of the security target facilitates the confirmation of whether a suspicious person has intruded from the warning area into the security area, and allows the security status of the security target to be automatically controlled to the security-activated status based on various detection patterns of the detection means, so that it is possible to prevent the activation of security from being forgotten and make security higher.

[Security Processing by Security System]

Figure 14:
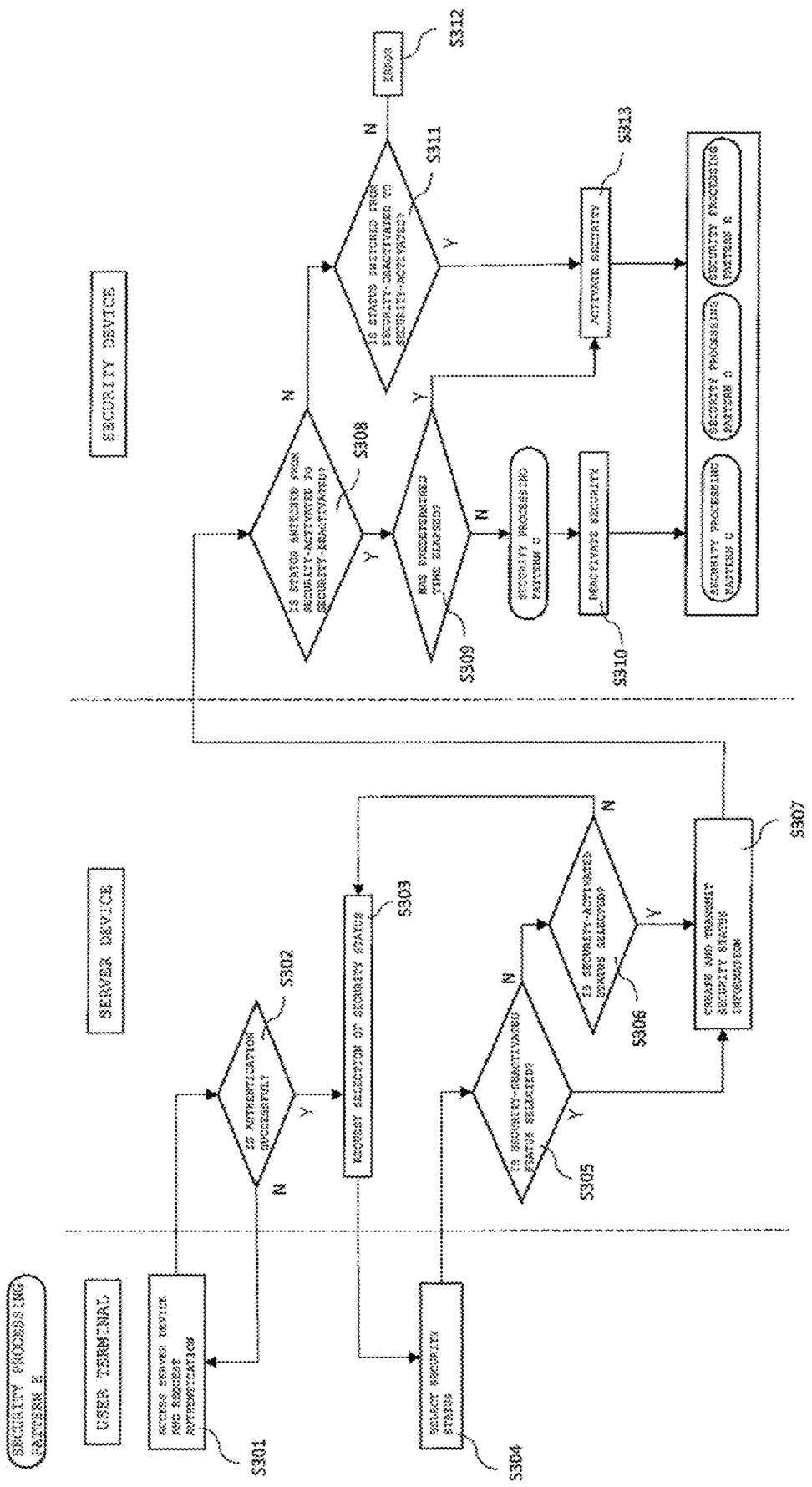
FIG. 14 is a flowchart illustrating an example of security processing performed by the security system illustrated in FIG. 13.
Figure 15:
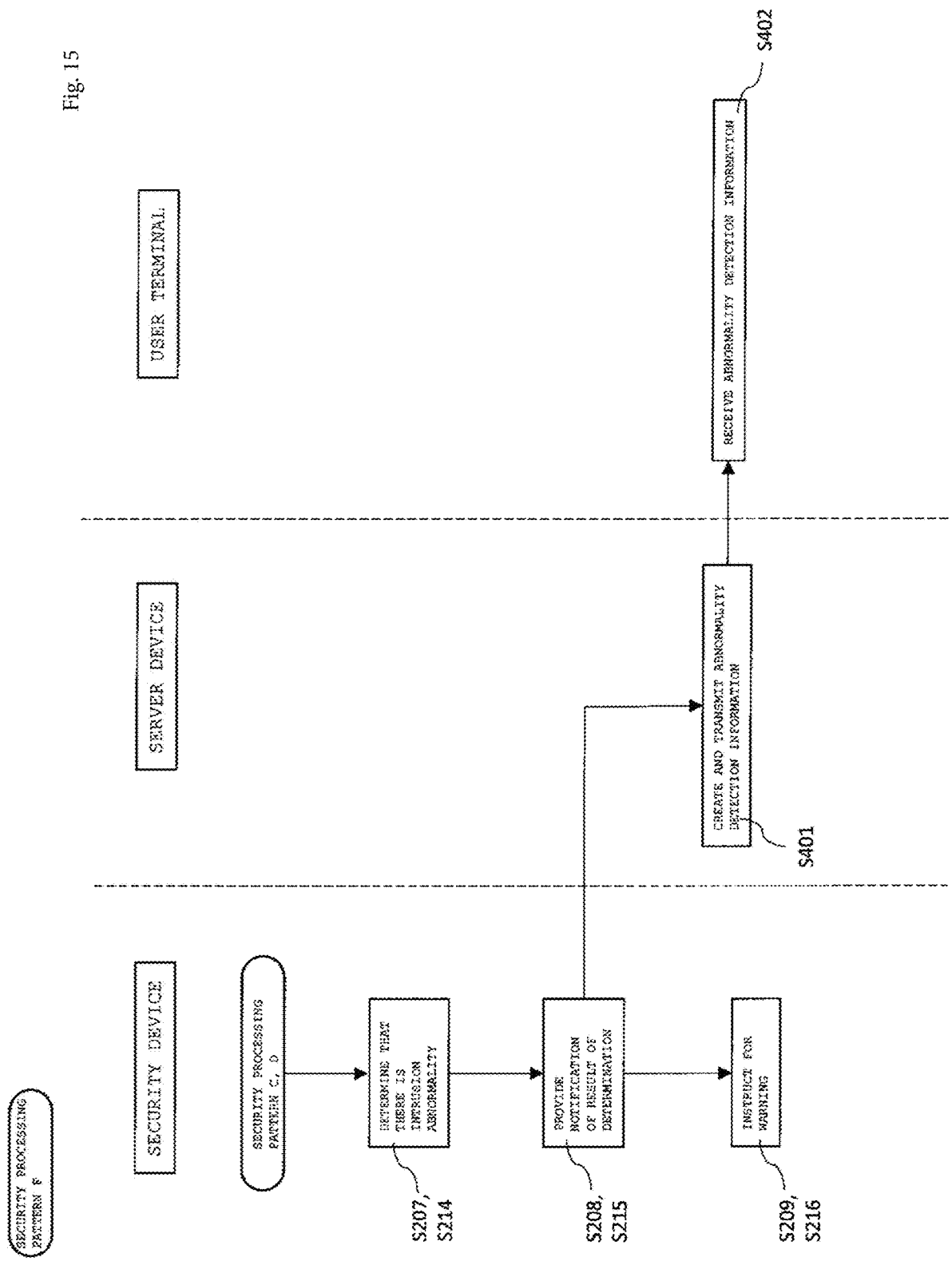
FIG. 15 is a flowchart illustrating another example of the security processing performed by the security system illustrated in FIG. 13.

A description will be given below of a flow of security processing by the security system 31 illustrated in FIG. 13 with reference to FIGS. 14 and 15. Note that the flow of the security processing by the security device 1B included in the security system 31 corresponds to the above-described security processing patterns C, D, and thus no description will be given below of the flow.

1. Security Processing Pattern E

A ship such as a yacht or a boat is set as the security target 22, the detection means 14A, 14B illustrated in FIG. 4(*a*) and the security device 1B including RFID reception devices 19A, 19B are installed at an anchorage that is the warning area 24, and the security status of the security target 22 is set to the security-activated status (see FIG. 9). Further, the owner (user 29) of the ship such as a yacht or a boat carries the RFID tag 18. The storage unit 8 of the security device 1B stores information on the security-deactivation detection order of the detection means "first: the detection means 14A".

(S301) The user terminal 33 executes an application program related to the security system 31 according to the present embodiment, and transmits the authentication request for instructing the security device 1B to set the security status of the security target 22 to the security-activated or security-deactivated status to the server device 32.

(S302) The authentication unit 39 performs processing of authenticating the user terminal 33 based on information on authentication such as an ID and a password of the user 29 stored in the storage unit 38.

(S303) The security status setting instruction unit 40 performs processing of causing the user terminal 33 that has succeeded in authentication to make a selection for the security status of the security target 22. The predetermined selection screen is displayed on the user terminal 33 to allow selection between the security-activated status and the security-deactivated status for the security status of the security target 22.

(S304 to S307) The security target 22 is set to the security-activated status, so that the user terminal 33 selects the security-deactivated status for the security status of the security target 22 (S304, S305: Y).

The security status information creation unit 41 creates security status information in which a flag "1" indicating that the security status of the security target 22 is a standby status for security deactivation is associated with the selection instruction processing information (instruction for selection of the security-deactivated status) from the user terminal 33 and transmits the security status information to the security device 1B (S307). In this case, the security target 22 is under security by the security device 1B, but the security target 22 is in a standby status where the security-deactivated status can be set by identifying the RFID tag 18 held by the user 29.

(S308, S309) When the user terminal 33 selects the security-deactivated status for the security status of the security target 22 set to the security-activated status, the elapsed time measurement unit 42 measures a time elapsed from the selection and determines whether the predetermined time (for example, 10 minutes) has elapsed.

(S310) When the predetermined time has not elapsed, that is, when the owner of the ship (user 29) has come to the warning area 24 with the RFID tag 18 (S309: N), the determination unit 10 of the security device 1B determines the security status of the security target 22 in accordance with the above-described security processing pattern C.

As a result, when it is determined that there is no abnormality in entry processing, the security status control unit 13 of the security device 1B sets the security status of the security target 22 to the security-deactivated status based on the security status information acquired from the server device 32.

Subsequently, the processing proceeds to the above-described security processing pattern D.

After the security is deactivated, the position of the user 29 in the security area 23 or the warning area 24 can be recognized through the above-described processing performed by the person detection position recognition unit 11, and the movement path of the user 29 can be confirmed through the processing of increasing the detection frequency of the detection means 14 performed by the detection condition setting unit 12.

Further, the determination result notification unit 5 notifies the external terminal 17 of the result of the determination performed by the determination unit 10 that there is no abnormality, and the image information transmission unit 6 transmits, to the external terminal 17, the identification information on the RFID tag 18 with the identification information on the RFID tag 18 associated with the image information containing the still image or moving image obtained as a result of capturing the security status of the security area 23 and warning area 24 of the security target 22 by the imaging means 16, so that the security service provider who owns and uses the external terminal 17 can know the security status of the security target 22 and can confirm the owner of the RFID tag 18.

(S311 to S313) When the user terminal 33 selects the security-activated status for the security status of the security target 22 set to the security-deactivated status (S304, S305: N, S306: Y), the security status information creation unit 41 creates security status information in which a flag "0" indicating that the security status of the security target 22 is set to the security-activated status is associated with the selection instruction processing information of the user terminal 33, and transmits the security status information to the security device 1B (S307). In this case, the security status control unit 13 of the security device 1B sets the security status of the security target 22 to the security-activated status (S308: N, S311: Y, S313).

Further, when the user terminal 33 selects the security-deactivated status for the security status of the security target 22 set to the security-activated status, and the elapsed time measurement unit 42 measures a time elapsed from the selection and determines that the predetermined time has elapsed (S308: Y, S309: Y), that is, when the owner (user 29) has not come to the warning area 24 with the RFID tag 18, the security status control unit 13 of the security device 1B maintains the security status of the security target 22 in the security-activated status (S313). Further, the security status information creation unit 41 creates security status information in which a flag "0" indicating that the standby status where the security-deactivated status can be set to the security target 22 is associated with the setting processing information of the security device 1B.

Subsequently, the processing proceeds to the security processing pattern E and the above-described security processing pattern D.

2. Security Processing Pattern F (S207, S214) When the determination unit 10 determines that the security status of the security target 22 shows an intrusion abnormality in the above-described security processing patterns C, D by the security device 1B, the determination result notification unit 5 transmits the result of the determination to the server device 32 (S208 and S215 in FIG. 11).

(S401) The abnormality detection information creation unit 43 of the server device 32 performs processing of creating abnormality detection information for use in notification of an abnormality detected in the security target 22 based on the result of the determination or the image information by the imaging means 16 transmitted from the security device 1B. The abnormality detection information thus created is transmitted to the user terminal 33 and the service provider terminal 34.

(S402) The owner (user 29) or the security service provider can immediately know the security status of the security target 22 based on the abnormality detection information thus transmitted and can quickly take a corresponding measure (for example, notify the police, dispatch security guards, or the like).

In addition, the position of the suspicious person in the security area 23 or the warning area 24 is recognized through the above-described processing performed by the person detection position recognition unit 11, and the detection frequency of the detection means 14 is increased through the processing performed by the detection condition setting unit 12, so as to track the suspicious person.

REFERENCE SIGNS LIST 1 (1A, 1B) security device
2 control device
3 information transmission/reception unit
4 detection signal acquisition unit
5 determination result notification unit
6 image information transmission unit
7 warning instruction unit
8 storage unit
9 detection order comparison unit
10 determination unit
11 person detection position recognition unit
12 detection condition setting unit
13 security status control unit
14 (14A, 14B, . . . ) detection means
15 warning means
16 imaging means
17 external terminal
18 RFID tag
19 (19A, 19B, . . . ) RFID reception device
20 RFID identification unit
22 security target
23 security area
24 warning area
25 non-warning area
26 (26a, 26b, . . . ) detection range
27 (27a, 27b, . . . ) overlapping detection range
28 (28a, 28b, . . . ) movement path
29 user
30 entrance gate
31 security system
32 server device
33 user terminal
34 service provider terminal
35 communication network
36 information transmission/reception unit
37 control unit
38 storage unit
39 authentication unit
40 security status setting instruction unit
41 security status information creation unit
42 elapsed time measurement unit
43 abnormality detection information creation unit

The invention claimed is:

1. A security device including a plurality of detection means configured to detect a person, the security device being configured to control a security status of a security target to a security-activated status or a security-deactivated status based on whether the person has been detected within a detection range of each of the detection means, the security device comprising:
an RFID reception device configured to receive identification information transmitted by an RFID tag;
a memory storing one or more programs including instructions; and
a processor that executes the instructions stored in the memory to:
perform a comparison to determine whether a detection order of the detection means that have detected the person coincides with a security-activation detection order of the detection means or a security-deactivation detection order of the detection means that is prestored;
control the security status of the security target from the security-deactivated status to the security-activated status or from the security-activated status to the security-deactivated status;
identify the RFID tag based on the identification information on the RFID tag received by the RFID reception device; and
perform a determination whether a suspicious person has intruded into the security target, wherein
with the security status of the security target set to the security-activated status, when the comparison shows that the detection order of the detection means that have detected the person coincides with the security-deactivation detection order of the detection means and the RFID tag has been identified, the processor executes the instructions stored in the memory to determine that there is no abnormality in entry processing, and to control the security status of the security target to the security-deactivated status, and with the security status of the security target set to the security-deactivated status, when the comparison shows that the detection order of the detection means that have detected the person coincides with the security-activation detection order of the detection means and the RFID reception device has not received the identification information on the RFID tag, the processor executes the instructions stored in the memory to determine that there is no abnormality in exit processing, and to control the security status of the security target to the security-activated status.

2. The security device according to claim 1, wherein with the security status of the security target set to the security-activated status or the security-deactivated status, the processor executes the instructions stored in the memory to:

determine that there is an intrusion abnormality in any one of following cases (1) to (4); and transmit a result of the determination to an external terminal:

(1) with the security status of the security target set to the security-activated status, the comparison shows that the detection order of the detection means that have detected the person does not coincide with the security-deactivation detection order of the detection means;

(2) with the security status of the security target set to the security-activated status, the comparison shows that the detection order of the detection means that have detected the person coincides with the security-deactivation detection order of the detection means, but the RFID reception device has not received the identification information on the RFID tag;

(3) with the security status of the security target set to the security-activated status, the comparison shows that the detection order of the detection means that have detected the person coincides with the security-deactivation detection order of the detection means, but the processor has failed to identify the RFID tag; and (4) with the security status of the security target set to the security-deactivated status, the RFID reception device has not received the identification information on the RFID tag, and the comparison shows that the detection order of the detection means that have detected the person does not coincide with the security-activation detection order of the detection means.

3. The security device according to claim 2, further comprising a warning means configured to provide, when the processor determines that there is an abnormality, notification of the abnormality.

4. The security device according to claim 1, wherein the RFID reception device is provided for each of the detection means.

5. The security device according to claim 1, wherein processor further executes the instructions stored in the memory to transmit the identification information on the RFID tag to an external terminal with the identification information on the RFID tag associated with information on the security state of the security target.

6. The security device according to claim 1, wherein the processor further executes the instructions stored in the memory to:

acquire a detection signal for the detection range of each of the detection means that have detected the person at a time $t_n$; and recognize of which detection means the person is present within the detection range based on intensity of the detection signal.

7. The security device according to claim 1, wherein each of the detection means includes a plurality of detection ranges different in detection intensity from each other.

8. The security device according to claim 1, wherein the processor further executes the instructions stored in the memory to set a detection interval of each of the detection means based on whether the person has been detected.

9. A security system comprising:

a server device;

a security device communicatively connected to the server device over a communication network;

a plurality of detection means provided within the security device or attached to the security device, the plurality of detection means being configured to detect a person;

an RFID reception device provided within the security device or attached to the security device;

a user terminal communicatively connected to the server device over the communication network; and an RFID tag configured to communicate with the RFID reception device over radio waves, the security system being configured to control a security status of a security target to a security-activated status or a security-deactivated status based on whether the person has been detected within a detection range of each of the detection means and whether the RFID reception device has received identification information on the RFID tag, wherein the server device includes:

a memory storing one or more programs including instructions; and a processor that executes the instructions stored in the memory to:

cause the user terminal to make a selection for the security status of the security target; and transmit, to the security device, security status information based on the security status of the security target selected, wherein the security device includes:

a memory storing one or more programs including instructions; and a processor that executes the instructions stored in the memory to:

perform a comparison to determine whether a detection order of the detection means that have detected the person coincides with a security-activation detection order of the detection means or a security-deactivation detection order of the detection means that is prestored;

control the security status of the security target from the security-deactivated status to the security-activated status or from the security-activated status to the security-deactivated status;

identify the RFID tag based on the identification information on the RFID tag received by the RFID reception device;

perform a determination whether a suspicious person has intruded into the security target; and transmit, to the server device, a result of the determination, and wherein with the security status of the security target set to the security-activated status, when the comparison shows that the detection order of the detection means that have detected the person coincides with the security-deactivation detection order of the detection means and the RFID tag has been identified, the processor of the security device executes the instructions stored in the memory to determine that there is no abnormality in entry processing, and to control the security status of the security target to the security-deactivated status based on the security status information acquired from the server device, and with the security status of the security target set to the security-deactivated status, when the comparison shows that the detection order of the detection means that have detected the person coincides with the security-activation detection order of the detection means and the RFID reception device has not received the identification information on the RFID tag, the processor of the security device executes the instructions stored in the memory to determine that there is no abnormality in exit processing, and to control the security status of the security target to the security-activated status based on the security status information acquired from the server device.

10. The security system according to claim 9, wherein
with the security status of the security target set to the security-activated status or the security-deactivated status, the processor of the security device executes the instructions stored in the memory to determine that there is an intrusion abnormality in any one of following cases (1) to (4):

(1) with the security status of the security target set to the security-activated status, the comparison shows that the detection order of the detection means that have detected the person does not coincide with the security-deactivation detection order of the detection means;

(2) with the security status of the security target set to the security-activated status, the comparison shows that the detection order of the detection means that have detected the person coincides with the security-deactivation detection order of the detection means, but the RFID reception device has not received the identification information on the RFID tag;

(3) with the security status of the security target set to the security-activated status, the comparison shows that the detection order of the detection means that have detected the person coincides with the security-deactivation detection order of the detection means, but the processor of the security device has failed to identify the RFID tag; and (4) with the security status of the security target set to the security-deactivated status, the RFID reception device has not received the identification information on the RFID tag, and the comparison shows that the detection order of the detection means that have detected the person does not coincide with the security-activation detection order of the detection means.

11. The security system according to claim 10, further comprising a warning means configured to provide, the processor of the security device determines that there is an abnormality, notification of the abnormality.

12. The security system according to claim 9, wherein the RFID reception device is provided for each of the detection means.

13. The security system according to claim 9, wherein
the processor of the server device further executes the instructions stored in the memory to create abnormality detection information used to provide notification of detection of an abnormality in the security target based the result of the determination acquired from the security device; and transmit, to the user terminal, the abnormality detection information created.

14. The security system according to claim 9, wherein
transmit, to the server device, the identification information on the RFID tag with the identification information on the RFID tag associated with information on a security state of the security target.

15. The security system according to claim 9, wherein
the processor of the security device further executes the instructions stored in the memory to:
acquire a detection signal for the detection range of each of the detection means that have detected the person at a time $t_n$; and
recognize of which detection means the person is present within the detection range based on intensity of the detection signal.

16. The security system according to claim 9, wherein
each of the detection means includes a plurality of detection ranges different in detection intensity from each other.

17. The security system according to claim 9, wherein
the processor of the security device further executes the instructions stored in the memory to set a detection interval for each of the detection means based on whether the person has been detected.

\* \* \* \* \*